(12) United States Patent
Wohaibi et al.

(10) Patent No.: US 11,434,439 B2
(45) Date of Patent: Sep. 6, 2022

(54) ENVIRONMENT-FRIENDLY MARINE FUEL

(71) Applicant: MAWETAL LLC, Nacogdoches, TX (US)

(72) Inventors: Mohammed Wohaibi, Nacogdoches, TX (US); Tom F. Pruitt, Nacogdoches, TX (US)

(73) Assignee: Mawetal LLC, Nacogdoches, TX (US)

( * ) Notice: Subject to any disclaimer, the term of this patent is extended or adjusted under 35 U.S.C. 154(b) by 418 days.

(21) Appl. No.: 16/731,657

(22) Filed: Dec. 31, 2019

(65) Prior Publication Data

US 2020/0199465 A1    Jun. 25, 2020

Related U.S. Application Data

(62) Division of application No. 16/089,894, filed as application No. PCT/US2016/057540 on Oct. 18, 2016, now Pat. No. 10,640,718.

(51) Int. Cl.
*C10G 67/14*    (2006.01)
*C10L 1/04*    (2006.01)
(Continued)

(52) U.S. Cl.
CPC .............. *C10G 67/14* (2013.01); *C10G 45/02* (2013.01); *C10G 67/04* (2013.01); *C10L 1/04* (2013.01);
(Continued)

(58) Field of Classification Search
CPC ........ C10G 67/14; C10G 45/02; C10G 67/04; C10G 2300/1044; C10G 2300/1048;
(Continued)

(56) References Cited

U.S. PATENT DOCUMENTS 2,987,465 A    6/1961    Johanson
3,197,288 A    7/1965    Johanson
(Continued)

FOREIGN PATENT DOCUMENTS

CN    103927461    7/2014
CN    205544287    8/2016
(Continued)

OTHER PUBLICATIONS

Scott; R. Derek; Ship to Shore Power US Navy Humanitarian Relief; 2006; 7 pages; Massachusetts Institute of Technology, 6.691 Seminar in Electric Power Systems; US Navy.
(Continued)

*Primary Examiner* — Pamela H Weiss
(74) *Attorney, Agent, or Firm* — Tom F. Pruitt

(57) ABSTRACT

For the shipping industry, these fuels provide solutions to long outstanding technical problems that heretofore hindered supply of low sulfur marine fuels in quantities needed to meet worldwide sulfur reduction goals. Marine shipping use of high sulfur bunker oils is reported as largest source of world-wide transportation SOx emissions. When ships on the open seas burn cheap low grade heavy bunker oils high in sulfur, nitrogen and metals, the SOx, NOx, and metal oxides go to the environment. This invention converts essentially all of each barrel of crude feed to a single ultraclean fuel versus conventional refining where crude feed is cut into many pieces, and each piece is sent down a separate market path meeting various different product specifications. When in port, ships can use these fuels to generate and sell electricity to land based electrical grids to offset fuel cost in an environment-friendly manner.

4 Claims, 2 Drawing Sheets

(51) Int. Cl.
*C10L 1/08* (2006.01)
*C10G 45/02* (2006.01)
*C10G 67/04* (2006.01)

(52) U.S. Cl.
CPC ........ *C10L 1/08* (2013.01); *C10G 2300/1044* (2013.01); *C10G 2300/1048* (2013.01); *C10G 2300/1074* (2013.01); *C10G 2300/1077* (2013.01); *C10G 2300/202* (2013.01); *C10G 2300/205* (2013.01); *C10G 2300/207* (2013.01); *C10G 2300/4056* (2013.01); *C10G 2300/42* (2013.01); *C10L 2200/0415* (2013.01); *C10L 2200/0438* (2013.01); *C10L 2200/0446* (2013.01); *C10L 2270/026* (2013.01); *C10L 2270/04* (2013.01); *C10L 2270/08* (2013.01); *C10L 2290/04* (2013.01); *C10L 2290/543* (2013.01); *C10L 2290/544* (2013.01)

(58) Field of Classification Search
CPC .... C10G 2300/1074; C10G 2300/1077; C10G 2300/202; C10G 2300/205; C10G 2300/207; C10G 2300/4056; C10G 2300/42; C10L 1/04; C10L 1/08; C10L 2200/0415; C10L 2200/0438; C10L 2200/0446; C10L 2270/026; C10L 2270/04; C10L 2270/08; C10L 2290/04; C10L 2290/543; C10L 2290/544; C10L 1/06; F02M 37/22; H02J 2310/42

See application file for complete search history.

(56) References Cited

U.S. PATENT DOCUMENTS

| | | | |
|---|---|---|---|
| 3,308,057 | A | 3/1967 | Van Driesn |
| 3,639,261 | A | 2/1972 | Slater |
| 3,775,304 | A | 11/1973 | McKinney et al. |
| 3,022,148 | A | 3/1976 | Thompson et al. |
| 4,640,762 | A | 2/1987 | Woods et al. |
| 4,824,552 | A | 4/1989 | Nagasawa et al. |
| 4,885,080 | A | 12/1989 | Brown et al. |
| 4,917,789 | A | 4/1990 | Butler et al. |
| 4,940,529 | A | 7/1990 | Beaton et al. |
| 5,066,476 | A | 11/1991 | Wetzel et al. |
| 5,124,027 | A | 6/1992 | Beaton |
| 5,322,829 | A | 6/1994 | Artes et al. |
| 5,962,763 | A | 10/1999 | Cossee et al. |
| 6,270,654 | B1 | 8/2001 | Colyar et al. |
| 6,329,725 | B1 | 12/2001 | Woodall et al. |
| 6,447,671 | B1 | 9/2002 | Morel et al. |
| 7,276,151 | B1 | 10/2007 | Okada et al. |
| 7,686,941 | B2 | 3/2010 | Brierley et al. |
| 7,799,207 | B2 | 9/2010 | Allinson et al. |
| 8,088,184 | B2 | 1/2012 | Hughes et al. |
| 8,987,537 | B1 | 3/2015 | Droubi et al. |
| 9,315,733 | B2 | 4/2016 | Koseoglu et al. |
| 10,443,006 | B1 | 10/2019 | Fruchey |
| 10,597,594 | B1 | 3/2020 | Fruchey |
| 10,883,056 | B2 | 1/2021 | Wohaibi et al. |
| 2003/0141220 | A1 | 7/2003 | O'Rear |
| 2004/0020826 | A1 | 2/2004 | Guyomar et al. |
| 2005/0188606 | A1 | 9/2005 | Caprotti et al. |
| 2005/0028853 | A1 | 12/2005 | Maund et al. |
| 2005/0288537 | A1 | 12/2005 | Maund et al. |
| 2006/0042999 | A1 | 3/2006 | Iqbal et al. |
| 2006/0133992 | A1 | 6/2006 | Dieckmann |
| 2006/0157385 | A1 | 7/2006 | Montanari et al. |
| 2006/0175229 | A1 | 8/2006 | Montanari et al. |
| 2007/0108100 | A1 | 5/2007 | Satchell, Jr. |
| 2008/0011643 | A1 | 1/2008 | Lenglet |
| 2008/0060976 | A1 | 3/2008 | Brierly et al. |
| 2009/0159493 | A1 | 6/2009 | Bhattacharya |
| 2009/0165365 | A1 | 7/2009 | Jordan |
| 2009/0308788 | A1 | 12/2009 | Lenglet |
| 2010/0077653 | A1 | 4/2010 | Hughes et al. |
| 2010/0206042 | A1 | 8/2010 | Johns et al. |
| 2011/0198265 | A1 | 8/2011 | Colvar et al. |
| 2013/0185044 | A1 | 7/2013 | Chen et al. |
| 2014/0001092 | A1 | 1/2014 | Mezza et al. |
| 2014/0221713 | A1 | 8/2014 | Baldassar et al. |
| 2015/0041634 | A1 | 2/2015 | Quann et al. |
| 2015/0353851 | A1* | 12/2015 | Buchanan ............... C10L 10/02 208/15 |
| 2015/0376513 | A1 | 12/2015 | Van Wees et al. |
| 2016/0138392 | A1 | 5/2016 | Pomerantz |
| 2016/0281009 | A1 | 9/2016 | Aubry et al. |
| 2018/0230387 | A1 | 8/2018 | Moore |
| 2019/0093026 | A1 | 3/2019 | Wohaibi |
| 2019/0185772 | A1 | 6/2019 | Berkhous |
| 2020/0165535 | A1 | 5/2020 | Fruchey |
| 2020/0277533 | A1 | 9/2020 | Markkanen |
| 2020/0291318 | A1 | 9/2020 | Shetkar |

FOREIGN PATENT DOCUMENTS

| | | |
|---|---|---|
| EP | 2615264 | 7/2013 |
| EP | 3020788 | 5/2016 |
| FR | 2843968 | 3/2004 |
| KR | 20160010369 | 7/2016 |
| WO | 1999/049003 | 9/1999 |
| WO | WO 1999/047626 | 9/1999 |
| WO | 2009/080679 | 7/2009 |
| WO | 2015/000841 | 1/2015 |
| WO | 2016/089590 | 6/2016 |

OTHER PUBLICATIONS

Siemens; A New Concept for Japan's Power Needs; Pictures of the Future; https://www.siemens.com/innovation/en/home/pictures-of-the-future/energy-and-efficiency/sustainable-power-generation-power-ship-japan.html; Mar. 5, 2015; 3 pages; Siemens Corporation.

LNG/Floating LNG (Mitsubishi), https://www.mhicompressor.com/en/products/outine/detail/lng.html; Dec. 17, 2018 download; 3 pages; Mitsubishi Heavy Industries Compressor Corporation; [Note this reference is opposite flow for liquefaction "Afterwards, the natural gas is stored in an LNG tank. Recently, in addition to the conventional "On-shore" LNG Plant, new technologies have created Floating LNG (F-LNG) which allows for offshore liquefaction"].

Wang et al; Costs and Benefits of Shore Power at the Port of Schenzhen; ICCT; Wilson Center; Dec. 2015 (37 pages).

United States International Searching Authority; PCT International Search Report and Written Opinion in PCT International Application Serial No. PCT/US2016/057546 dated Mar. 16, 2017 (15 pages).

United States International Preliminary Examinaton Authority; International Preliminary Report on Patentability (Chaper II) for PCT/US2016/057540; 27 pages; dated Dec. 27, 2018; US.

United States International Searching Authority; PCT International Search Report and Written Opinion in PCT International Application Serial No. PCT/US2016/057540 dated May 1, 2017 (16 pages).

United States International Preliminary Examinaton Authority; International Preliminary Report on Patentability (Chaper II) for PCT/US2016/057546; 59 pages; dated Feb. 15, 2018; US.

PCT International Search Report and Written Opinion PCT International Application Serial No. PCT/US2016/057536 dated Feb. 24, 2017.

J Prousalidis: ""Improving the Efficiency of Ship Energy Chain within the All Electric Ship Framework" The Greek Section of The Society of Naval Architects and Marine Engineers (SNAME) Improving the Efficiency of Ship Energy Chain within the All Electric Ship Framework of Naval Architecture and Marine Engineering", Sep. 19, 2013 (Sep. 19, 2013), XP055698669, Retrieved from the Internet: URL:https://higherlogicdownload.s3.amazonaws.com/SNAME/a09ed13c-b8c0-4897-9e87-eb86f500359b/UploadedImages/Presentation,%Prousalidis,%2019%20Sept%202013.pdf.

(56) References Cited

OTHER PUBLICATIONS

Bill Siuru: "A crew prepares Cold ironing: An approach to shipaEUR(TM)s power whose time has come 12:00 AM" Apr. 10, 2008 (Apr. 10, 2008), XP055698672, Retrieved from thee Internet: URL:http://www.professionalmariner.com/April-2008/Cold-ironing-An-approach-to-ship-226-128-153s-power-whose-time-has-come/ [retrieved on May 26, 2020].

Wauquier, Jean-Pierre; Petroleum Refining, vol. 2 Separation Processes, Ch 5; Distillation, Absorption and Stripping in the Petroleum Industry, 2000, pp. 221-224; 2000.

United States International Preliminary Examinaton Authority; International Preliminary Report on Patentability (Chaper II) for PCT/US2016/057536; 54 pages; dated Apr. 26, 2019; US.

Smyshlyaeva et al; Influence of Asphaltenes on the Low-Sulphur Residual Marine Fuels' Stability; Journal of Marine Science and Engineering; 13 pages; Nov. 8, 2021; J. Mar. Sci. Eng. 2021, 9, 1235. https://doi.org/10.3390/jmse9111235.

Fahim et al.; "Fundamentals of Petroleum Refining" Gary and Handwerk equation 9.5 for flashpoint calculation; 2010 Elsevier; NL.

Mathpro, An Introduction to Petroleum Refining and the Production of Ultra Low Sulfur Gasoline and Diesel Fuel; Oct. 24, 2011; (38 pages); URL <http://www.theicct.org/sites/default/files/publications/ICCT05_Refining_Tutorial_FINAL_R1.pdf>; The International Council on Clean Transportation; United States.

Olsen, Tim; An Oil Refinery Walk-Through; Chemical Engineering Progress; May 2014; (8 pages); URL: <http://www2.emersonprocess.com/siteadmincenter/PM Articles/OilRefineryWalk-Through_CEP_May2014_Hi-Res.pdf>; American Institute of Chemical Engineers, United States.

U.S. Environmental Protection Agency, Sector Policies and Programs Division Office of Air Quality Planning and Standards; Available and Emerging Technologies for Reducing Greenhouse Gas Emissions from the Petroleum Refining Industry; Oct. 2010; (42 pages); URL: <https://www.epa.gov/sites/production/files/2015-12/documents/refineries.pdf>; U.S. EPA Research Triangle, NC, United States.

U.S. Energy Information Administration; Glossary; at least as early as Oct. 11, 2016; (17 pages); URL: <https://www.eia.gov/tools/glossary/index.cfm?id=petroleum>.

U.S. Energy Information Administration; Oil: Crude and Petroleum Products Explained; at least as early as Oct. 11, 2016; (3 pages); URL: <https://www.eia.gov/energyexplained/index.php?page=oil_refining#tab2>.

U.S. Energy Information Administration; Petroleum & Other Liquids, Refinery Yield; Jul. 31, 2018; (1 page); URL <https://www.eia.gov/dnav/pet/PET_PNP_PCT_DC_NUS_PCT_A.htm>.

Petrojam Limited; Hydroskimming—The Refinery Process; 2012; (3 pages) URL: <http://www.petrojam.com/resources/11/general/hydroskimming-refinery-process>; Petrojam Processing Plant, Kingston, Jamaica.

Hague, Kjeil; Refining ABC; at least as early as Oct. 11, 2016; (13 pages); URL <http://www.statoil.com/en/InvestorCentre/Presentations/Downloads/Refining.pdf>; Equinor ASA, Stavanger Norway (formerly Statoil).

International Energy Agency; IEA Refinery Margins, Methodology Notes; Sep. 2012; (14 pages); URL <https://www.iea.org/media/omrreports/Refining_Margin_Supplement_OMRAUG_12SEP2012.pd>; International Energy Agency, Paris, France.

Jechura, John; Petroleum Refining; Aug. 11, 2016; (45 pages); URL: <http://inside.mines.edu/~jjechura/Refining/01_Introduction.pdf>; Colorado School of Mines, Golden, CO, US.

Wikipedia; Petroleum Refining Processes; at least as early as Oct. 11, 2016; (7 pages); URL <https://en.wikipedia.org/wiki/Petroleum_refining_processes#The_crude_oil_distillation_unit>.

Occupational Safety and Health Administration; OSHA Technical Manual, Section IV: Chapter 2—Petroleum Refining Process; at least as early as Oct. 11, 2016; (30 pages); URL <https://www.osha.gov/dts/osta/otm/otm_iv/otm_iv_2.html>; U.S. Department of Labor, United States.

Bagajewicz, Miguel J.; CHE 5480 Simulation, Optimization and Decision Making in Oil and Gas Processing, Lecture—Petroleum Fractionation-Overview, *Overview of Crude Units*; Spring 2007; (35 pages) URL: <http://www.ou.edu/class/che-design/che5480-07/Petroleum%20Fractionation-Overview.pdf>; University of Oklahoma, United States.

Jechura, John; Hydroprocessing: Hydrotreating & Hydrocracking, Chapters 7 & 9; 2017; (56 pages); URL: <http://inside.mines.edu/~jjechura/Refining/08_Hydroprocessing.pdf>; Colorado School of Mines, Golden, CO, United States.

Vermeire, Monique B.; Everything You Need to Know About Marine Fuels; Jun. 2012; (32 pages); URL: <http://www.chevronmarineproducts.com/docs/Chevron_EverythingYouNeedToKnowAboutFuels_v3_1a_DESKTOP.pdf>; Chevron Global Marine Products, Ghent, Belgium.

United States Coast Guard; Ultra Low Sulfur Fuel Oil & Compliance with MARPOL Requirements, Nov. 19, 2015, URL: <https://www.uscg.mil/hq/cg5/cg545/alerts/0215.pdf>.

Gavriil, Gavriil et al.; Steaming Heat Coils for Heating Up Marine Heavy Fuel Oil; 8th GRACM International Congress on Computational Mechanics, Volos; Jul. 12-Jul. 15, 2015; (8 pages); URL: <www.8gracm.mie.uth.gr/Papers/Session%20D3-C3/G.%20Prodromidis.pdf>; Department of Environmental & Natural Resources Management, University of Patras, Greece and Marine Boiler Repairs Ltd., Greece.

Wright, A.A. et al.; Flashpoint of Marine Distillate Oil Fuels, Issues and Implications Associated With the Harmonization of the Minimum Flashpoint Requirement for Marine Distillate Oil Fuels with that of Other Users; Jan. 27, 2012; URL: <https://docplayer.net/14610950-Flashpoint-of-marine-distillate-oil-fuels.html>; Lloyds Register, fobas/001386/2011-4.

American Bureau of Shipping; Notes on Heavy Fuel Oil; Jan. 1984; (68 pages); URL: <https://ww2.eagle.org/en/rules-and-resources/rules-and-guides.html#/content/dam/eagle/rules-and-guides/current/other/31_heavyfueloil>; American Bureau of Shipping, Houston, TX, United States.

What-When-How; Separation Process; at least as early as Oct. 11, 2016; (5 pages); URL <http://what-when-how.com/petroleum-refining/separation-processes/>.

Morel, F. et al.; Hydrocracking Solutions Squeeze more ULSD from Heavy Ends; Hydrocarbon Processing; Nov. 2009; (8 pages); URL: <http://www.axens.net/document/15/hydrocracking_hp2009/english.html>; Axens IFP Group Technologies.

Amerigreen Energy; Ultra Low Sulfur Heating Oil FAQ's; Oct. 6, 2015; (3 Pages); URL: <http://www.amerigreen.com/education-article/ultra-low-sulfur-heating-oil-faqs/>; Amerigreen Energy, Lancaster, PA, United States.

Rising, Bruce et al.; Survey of Ultra-Trace Metals in Gas Turbine Fuels; Prepr. Pap-Am. Chem. Soc., Div Fuel Chem 2004, 49 (1), 404 (3 pages); URL <https://web.anl.gov/PCS/acsfuel/preprint%20archive/Files/49_1_Anaheim_03-04_0882.pdf>.

S&P Global Platts; Why High Sulfur Distillate Still Finds a Home in the U.S. Oil Market; Jul. 5, 2012; (5 Pages); URL <http://blogs.platts.com/2012/07/05/why_high_sulfur/>; The Barrell Blog.

Sharmak, B.K. et al.; Maltens and Asphaltenes of Petroleum Vacuum Residues: Physico-Chemical Characterization; Petroleum Science and Technology, 25: 93-104, 2007; (12 pages); URL: <http://naldc.nal.usda.gov/download/20659/PDF>; Taylor & Francis Group, United States.

Auers, John R. et al.; The North Dakota Petroleum Council Study on Bakken Crude Properties; Bakken Crude Characterization Task Force; Aug. 4, 2014; (78 pages); URL: <http://www.ndoil.org/image/cache/Bakken_Quality_Report.pdf>; Prepared for the North Dakota Petroleum Council by Turner Mason & Company Consulting Engineers, Dallas, TX, United States.

International Maritime Organization; Sulphur Oxides (SOx) and Particulate Matter (PM)—Regulation 14; at least as early as Oct. 11, 2016; (2 pages); URL: <http://www.imo.org/en/OurWork/environment/pollutionprevention/airpollution/pages/sulphur-oxides-(sox)—regulation-14.aspx >; International Maritime Organization; London, UK.

(56) References Cited

OTHER PUBLICATIONS

International Standards Organization (ISO), Table 2—Residual marine Fuels; 2012 (2 pages); URL: <http://a.pmcdn.net/p/xbw/iso/iso8217_2012_residual.pdf>; International Standards Organization. Geneva, Switzerland.
Sabathier, J. et al.; Framework Contract for Technical Support in Relation to the Quality of Fuels, Advice on Marine Fuel; Draft Report No. 201131; Oct. 2003; (27 pages); URL: <http://ec.europa.eu/environment/air/pdf/beicipfranlab_report.pdf>; BeicipFranlab, Rueil-Malmaison Cedex, France.
Powerscorcard, Electricity from Oil; 2002 (x pages); URL: <http://powerscorecard.org/tech_detail.cfm?resource_id=8>; Pace University, Energy and Climate Center, White Plains New York.
International Energy Agency; Energy Snapshot of the Week; Mar. 31, 2015; (2 pages); URL: <https://www.iea.org/newsroomandevents/graphics/2015-03-31-crude-oil-for-electricity-production-japan.html>.
European Environment Agency; Electricity Production by Fuel (ENER 027)—Assessment Published Apr. 2012; Apr. 30, 2012; (6 pages); URL <http://www.eea.europa.eu/data-and-maps/indicators/electricity-production-by-fuel-1/electricity-production-by-fuel-assessment-3>.
European Environment Agency; Graph Image, Gross Electricity Production by Fuel; Apr. 30, 2012; (1 page); URL<http://www.eea.europa.eu/data-and-maps/figures/gross-electricity-production-by-fuel-4/ener27_fig_01/image_large>.
Environment Canada, Emergencies Science and Technology Division; Gas Turbine Fuel Oil; at least as early as Oct. 11, 2016; (1 page); URL: <http://www.etc-cte.ec.gc.ca/databases/Oilproperties/pdf/WEB_Gas_Turbine_Fuel_Oil.pdf>.
Royal Academy of Engineering; Future Ship Powering Options, Exploring Alternative Methods of Ship Propulsion; Jul. 2013; (51 Pages); URL: >http://www.raeng.org.uk/publications/reports/future-ship-powering-options>.
Toepfer, Josiah; Is it True that the 15 Biggest Ships in the World Produce More Pollution than All the Cars?; Jun. 11, 2016; (5 pages); URL: ,https://www.quora.com/Is-it-true-that-the-15-biggest-ships-in-the-world-produce-more-pollution-than-all-the-cars>; QUORA.Com.
S&P Global Platts; The US Gulf Coast High Sulfur Fuel Oil Price: Oil Price Assessment; at least as early as Oct. 11, 2016; (2 pages); URL: <http://www.platts.com/price-assessments/oil/usgc-fuel-oil>.
Rall, H.T. et al.; Sulfur Compounds in Crude Oil; 1972; (194 pages); URL: <https://digital.library.unt.edu/ark:/67531/metadc12804/>; United States Department of the Interior, Bureau of Mines; UNT Digital Library.
Wauquier, Jean Paul; Crude Oil Petroleum Products, Process Flowsheets; 1995; (492 pages); URL: <https://archive.org/details/WauquierJeanPierre1995PetroleumRefiningV1CrudeOilPetroleumProductsProcessFlowsheets>; Editions Technip, Paris, France.
Rettger, Phil et al.; Gasification Technologies, the Long Lake Integrated Upgrading Project: Status Report and Discussion of Soot Processing; Oct. 1-4, 2006; (9 pages); URL: <http://w3.siemens.com/markets/global/en/oil-gas/PublishingImages/technologies/water-technology/products/zimpro/Gassification_Technologies.pdf>. Gasification Technologies, Washington, D.C., United States.
Council of the European Union; Council Directive 1999/32/ed, Apr. 26, 1999, (21 pages); URL < https://energy-community.org/dam/jcr:a1750e98-dbac-4bce-be0b-10de788bbe01/Directive_1999_32_EC.pdf>.
Baker & O'Brien Incorporated; Refining America's New Light Tight Oil (LTO) Production; OPIS 16th Annual National Supply Sumit, Las Vegas, Nevada, Oct. 28, 2014 (23 pages); URL: <http://www.bakerobrien.com/bakerobrien2/assets/File/Baker%20%20O'Brien%20OPIS%20National%20Supply%20Summit%20-%202010-28-14.pdf>.
Benoit, Brian et al.; Overcoming the Challenges of Tight/Shale Oil Refining; Processing Shale Feedstocks 2014; 8 pages); URL: <https://www.suezwatertechnologies.com/kcpguest/documents/Technical%20Papers_Cust/Americas/English/Overcoming_Challenges_of_Tight_Shale_Oil_Refining.pdf>; GE Water & Process Technologies.
Jukic, Ante; Petroleum Refining and Petrochemical Processes; 2013; (21 pages); URL: <https://www.fkit.unizg.hr/_download/repository/PRPP_2013_Natural_gas.pdf>; Faculty of Chemical Engineering and Technology, University of Zagreb, Croatia.
Eberhart, Dan; Light on Top, Heavy on the Bottom: A Crude Oil Refinery Primer; Feb. 14, 2014; (3 pages); URL: <http://www.team-bhp.com/forum/attachments/indian-car-scene/1455020d1451570702-official-fuel-prices-thread-crude-light-top-heavy-bottom-crude-oil-refinery-primer-canary-llc.pdf>; Canary USA.
Mathpro, Inc.; Effects of Possible Changes in Crude Oil Slate on the U.S. Refining Sector's CO2 Emissions, Final Report; Mar. 29, 2013; (59 pages); URL: <http://www.theicct.org/sites/default/files/publications/ICCT_Refinery_GHG_Study_Proj_Report_Apr2013.pdf>; Prepared for International Council on Clean Transportation.
Meher-Homji, Cyrus B. et al.; Gas Turbine Fuels-System-Design, Combustion and Operability; Proceedings of the Thirty-Ninth Turbomachinery Symposium, 2010; (32 pages); URL: <http://turbolab.tamu.edu/proc/turboproc/T39/ch16_Meher-Homji.pdf>/.
Welch, Mike et al.; Contaminants' Impact on Gas Turbine Operation; Jul. 31, 2014 (6 pages); URL: <http://www.plantservices.com/articles/2014/contaminants-impact-on-gas-turbine-operation/>; Plant Services, Schaumburg, IL, United States.
Welsch, Michael et al., Gas Turbine Fuel and Fuel Quality Requirements for Use in Industrial Gas Turbine Combustion, Proceedings of the Second Middle East Turbomachinery Symposium, Mar. 17-21, 2013; (10 pages); URL: < http://www.energy.siemens.com/US/pool/hq/energy-topics/pdfs/en/techninal%20paper/Siemens-Technical%20Paper-Gas-Turbine-Fuel-Quality-Requirements.pdf>; Turbomachinery Laboratory, Texas A&M University, United States.
Poloczek, Volker et al.; Modern Gas Turbines with High Fuel Flexibility; POWER-GEN Asia 2008—Kula Lumpur, Oct. 21-23, 2008; (19 pages); URL: <http://www.energy.siemens.com/us/pool/hq/energy-topics/pdfs/en/gas-turbines-power-plants/ModernGasTurbineswithHighFuelFlexibility.pdf>; Siemens AG, Energy Sector, Germany.
Igoe, Brian M. et al.; Impact of Fuel Contaminants on Gas Turbine peration; 21st Symposium of the Industrial Application of Gas Turbines Committee, Banaff, Alberta, Canada, Oct. 2015; 15-IAGT-303; (12 pages); URL: <https://www.eiseverywhere.com/file_uploads/7d3f5d08720db271571c4c47b1e66fa7_303Finalpaper.pdf>.
Office of Energy Efficiency & Renewable Energy; Hydrogen Production: Natural Gas Reforming; at least as early as Oct. 11, 2016 (x pages); URL: <http://energy.gov/eere/fuelcells/hydrogen-production-natural-gas-reforming>; U.S. Department of Energy, Washington DC, United States.
United States International Preliminary Examinaton Authority; International Preliminary Report on Patentability (Chaper II) for PCT/US2016/057540; 27 pages; Dec. 27, 2018; US.
Wang, et al.; Costs and Benefits of Shore Power at the Port of Shenzhen, Dec. 2015; 38 pages.
Mitsubishi; LNG/Floating LNG, https://www.mhicompressor.com/en/products/outine/detail/lng.html; Dec. 17, 2018; 3 pages; Mitsubishi Heavy Industries Compressor Corporation.
Scott; R. Derek; Ship to Shore Power US Navy Humanitarian Relief; 2006; 7 pages; Massachusetts Institute of Technology, 6.691 Seminar in Electric Power Systems; US.

* cited by examiner

ENVIRONMENT-FRIENDLY MARINE FUEL

CROSS REFERENCE TO RELATED APPLICATIONS

This application is a divisional of U.S. Ser. No. 16/089,894 filed on Sep. 28, 2018, which is a 371 National Phase of International Application Serial No. PCT/US2016/057540 filed on 18 Oct. 2016, both of which are incorporated herein by reference.

FIELD OF THE INVENTION

The invention relates to methods and apparatus to produce very low sulfur fuels from crude oils, refinery residual oils and other contaminated liquid feeds. Very low sulfur fuels made by this invention are especially cost effective for on-board large marine transport vessels and for on-shore large land based combustion gas turbines.

BACKGROUND OF THE INVENTION

This invention targets a long well known, large environmental problem, previously unsolved, that when ships 'on the open seas' burn cheap low grade heavy bunker oils and other heavy residues high in sulfur, nitrogen and metals, the oxides of sulfur, nitrogen and metals go to the environment. Such emissions are worldwide, not recognizing domestic geographical boundaries. Various third party reports indicate that certain global emissions generated by marine burning of such heavy fuels for water transport are many multiples higher than combined worldwide on short vehicle fleets burning gasoline and diesel fleets. Such marine burning produces emissions of SOx, NOx, CO2, soot and noxious metals. On shore vehicle fleets include cars, trucks, and others, many of which are now using mandated "highway fuels" having very low sulfur content. Thus, even if transport by such large ships is efficient based on 'ton of freight per mile' and fuel consumed basis, the reality is such ships generate large emissions.

Implementation of certain key regulations mandating ships' use of clearer burning marine fuels is conditional upon sufficient quantities of such fuels being available. Rightly so to not command that which is not possible or practical, either technically or economically, yet a solution is needed.

For example, the International Maritime Organization (IMO), a division of the United Nations, issues regulations pertaining to international shipping. IMO has sought to reduce emissions by issuing more stringent sulfur limits for maritime fuels, while recognizing technical constraints. IMO has required fuels that marine fuels fired after 2011 at open sea must have a sulfur content not exceeding 3.50% m/m (e.g. fired outside defined Emission Control Areas (ECAs) including 200 nautical miles from shores of United States, Europe and certain other areas). At 2015, IMO revised its regulations to limit marine fuel sulfur content to generally less then 0.1% sulfur for commercial ships within designated ECAs.

Yet for 2020 and later, IMO has again dropped open sea sulfur limits significantly to 0.50% m/m. However, IMO notes such aggressive drop in 2020 depends "on the outcome of a review, to be concluded by 2018, as to the availability of the required fuel oil" and suggests possible deferral of such drop to 2025 if required fuels are not available. See the Convention on Marine Pollution (MARPOL), Annex VI, for regulations of Air Pollution in the Maritime Industry. Thus there is real, significant likelihood of a problem with lack of supply availability of low sulfur marine fuels and lack of technology to achieve such supply. For illustration, an industry publication in 2015 stated that "plans are in place to reduce the sulfur content allowed in fuels to below the [2014] levels required in Emission Control Areas . . . but this is years away because current technology would make that cost prohibitive for many shipping companies. Such publication further states that "due to the extra costs and possible mechanical issues, these regulations are continuously reevaluated and phased approaches are used for implementation" since many marine engines are not designed to handle low sulfur gas oil because it is so much thinner than heavy fuel oil and it does not have the lubrication properties of the heavy fuel oil. Companies are using various workarounds to make it work, such as chilling the fuel to increase the viscosity or injecting extra lubricant into certain parts of the engine." Internet article published by Quora entitled "Is it true that the 15 biggest ships in the world produce more pollution than all the cars? by Josiah Toepfer, CG Office, Ship Inspector/Auditor, Casualty Investigator.

Another illustration is that, at 2015, IMO regulations dropped marine fuel sulfur content to a maximum of 0.1% sulfur for commercial ships within designated ECAs. Before entering ECAs, vessels must change fuels from sulfur rich, but low cost high sulfur heavy bunker fuel oil fired at open sea, to an expensive low sulfur fuel akin to highway diesel fuel. Drop of inside ECAs fuel sulfur from 1.00% m/m (for after 1 Jul. 2010) to 0.10% m/m for after 1 Jan. 2015 has created market supply and pricing challenges. Production and supply of such fuels for marine use for IMO related regulatory compliance competes with distillate fuel needs for highway and other onshore diesel applications and shifts available preferred feed streams, and also existing refinery apparatus and feed supply networks, away from highway use of diesel and other low sulfur distillates. Also, other technical issues arise onboard.

Regarding the 2015 IMO drop of sulfur content within ECAs, the United States Coast Guard issued alerts that "vessels using higher sulfur content fuels must change to ultra low sulfur (ULS) fuel oil to comply" with new regulations. Vessels must use ULS fuel oil on inbound and outbound transits, at the dock, and anytime within an ECA, thus each ship which uses higher sulfur content fuel oil is required to develop and implement changeover procedures for switching between residual and distillate fuels before entering ECAs. The Coast Guard further cautioned that "there are many other important technical issues associated with the use of ultra low sulfur fuel oils and fuel oil switching addressed in documents produced by class societies, insurers, engine manufacturers and industry associations" and that "the energy content of a given volume of ULS fuel oil may differ from residual fuel, such that existing throttle settings may not give the desired propeller shaft RPM or generator loads". United States Coast Guard U.S. Department of Homeland Security Inspections and Compliance Directorate Mar. 3, 2015 Safety Alert 2-15 Washington, D.C. Ultra Low Sulfur Fuel Oil & Compliance with MARPOL Requirements Before entering and while operating within Emission Control Areas.

A stark reality is that refineries are expensive, requiring significant capital investments even for what seem like relatively minor changes to fuel product or production apparatus or addition of unit operations. In the 2003 era, European refinery assessment studies were conducted in anticipation of needs for lower levels of contaminants in marine fuels and requirements and capabilities for producing same in necessary quantities. See for example Advice on Marine Fuel, Potential price premium for 0.5% S marine fuel; Particular issues facing fuel producers in different parts of the EU; and Commentary on marine fuels market, Draft Final Report Contract Number ENV.C1/SER/2001/0063. Order Slip n° C.1/3/2003. European Commission—Directorate General Environment, October 2003.

Such reports suggested great challenges, such as higher costs or decreases in refinery utilization or efficiency, when seeking to produce necessary quantities of suitable marine fuels in many countries, including in some instances, absence of local basic facilities near major ports to locally make and supply such marine fuels as well as the absence of technology and apparatus to so make such fuels.

The cited reports saw only three options. A "re-blending option" (blending heavy fuel oils with low sulfur fuels) was viewed as the lowest cost option for producing low sulfur bunkers, yet such was not adequate as it would only treat the lowest quantity of material no major costs. The option had relatively small costs associated to logistics for the re-blending of different categories of heavy fuels then currently produced by the European refineries but failed on quantities.

The second alternative by increased cost is the processing lower sulfur crude oils, by replacing high sulfur content crudes, such as Arabian Light, which was reported to contain 1.8% sulfur, with lower sulfur crudes, for instance by African crudes such as Bonny Light which was reported to contain 0.14% sulfur by weight. The estimated incremental costs for marine bunkers incurred by this alternative were considered excessive burdens for reasons set forth in the reports.

Finally, the old era reports mention a third most expensive option for the production of low sulfur marine grade fuels by desulfurization of vacuum residue (VRDS). The report concludes that "it is important to notice, however, that as opposed to the degree of desulfurization required for petrol or diesel, hydrotreating of the bottom of the barrel (residue desulfurization) is not a process that refiners are currently considering to implement per se, that is if it is not coupled with some conversion of residue to lighter products. Nonetheless, if VRDS was pursued for the sole objective of desulfurization of vacuum residue, the costs of this alternative" were be about double the second alternative, and therefore even more unacceptable.

To meet IMO requirements with prior art technologies, a ship operator can bunker both high sulfur content fuel oil for use at sea and a low sulfur content for use within an ECA; however, this choice can face issues with technology of the engines, lubricity, and possible needs for different fuel injection systems for optimum operations and mechanics of switching fuels. An operator can add post combustion flue treatment apparatus which may be relatively large, expensive and complex to maintain at highest performance levels. In some instances, liquefied natural gas (LNG) can be considered for used as marine fuel where, for example, some transportation carriers of LNG may elect to use 'boil off gas' for fuel, yet to extend this LNG engine concept to all cargo ships would require wide spread LNG refueling stations infrastructure which is very costly, with added costs for those ports in locations which do not have local natural gas production supplies or liquefaction facilities. However, in all cases, LNG use in lieu of liquids carries with such use a real risk of methane release during either bunkering by venting while refueling or incomplete combustion or otherwise during operations and maintenance. Such methane release is of concern since methane is attributed by some with many multiple times the impact as a greenhouse gas on the environment than sulfur dioxide. In a similar vein, some assert that emission reductions can be attained in marine applications by firing natural gas during shipping transport or while in port as facilitated by a harbor with a gas feed docking station. However, from one technical overview perspective, natural gas retains the methane leak issue and firing natural gas reduces $CO_2$ emissions not because it releases less $CO_2$, but instead, when compared to LNG, natural gas use avoids the $CO_2$ emissions generated during processing to liquefy LNG and reduces $CO_2$ when backing off or replacing coal for firing power plants that supply ships while in port. Development activities that push for LNG or natural gas to replace liquids as marine fuels as useful to consider but such do not provide any practical cost effective marine solution when there is a lack of worldwide gas infrastructure and new fueling infrastructure is needed, which gas distribution infrastructure is equipment and capital intense at ports in countries where local supplies of gas are not produced.

There is a need to solve these global environmental issues with marine fuels that are recognized, have going on for many years without a cost effective technical solution. In addition, availability of novel low costs fuels made by novel process configurations and apparatus should encourage ship owners to install highly efficient combined cycle propulsion power generation systems that have higher efficiency over diesel engines due to efficient use of waste heat recovery and do not have an issue with lack of fuel lubricity as do many engines when firing more expensive ultralow sulfur diesel that in limited supply.

However, there has long been a gap in effective fuels production technology causing a supply shortage of large quantities of very low sulfur marine fuels at low cost. The need to fill the gap remains.

International Energy Agency (EIA), Oil Industry and Markets Division publishes official public notes which describe processes and apparatus configurations used to produce fuel and describe conventional refinery configurations, products and margins. Terms used in herein, unless separately defined or expressly modified, shall have meaning assigned by the "Glossary, Source: U.S. Energy Information Administration (October 2016)" which is incorporated herein for all purposes. EIA publications define and discuss configurations for processing crude oils, all splitting each barrel of crude feed into multiple products for different applications or downstream processing.

The genetics of development or growth conventional refineries is somewhat root stock based on society's evolution of demands for products, evolving away from basic kerosene grade distillates for lighting toward multiple products such gasoline and diesel for vehicles, then aviation grade fuels, then feedstocks for many downstream chemicals applications. Refinery technical developments appear typically to have evolved in increments, directed as adaptations to either to maximize an amount of a given split from each barrel of crude for a particular market segment or to adapt refinery various streams for downstream chemicals production, all while retaining production of multiple products for different end use applications.

Thus, prior art refinery designs which use atmospheric crude and/or vacuum distillation units, solvent separations, hydrotreating, gasification, and many other unit operations, split each barrel of crude feed into multiple products each with different specifications for different applications or downstream processing.

In conventional refining is counter-intuitive to separate the feed into different unit effluent and then recombine all of such effluents. For illustration, EIA above reference defines and describes conventional or typical atmospheric crude oil distillation, vacuum distillation, fuel solvent deasphalting, catalytic hydrotreating, and integrated gasification-combined cycle technology, but not a configuration of such processes to convert substantially all of the crude oil feed to make a sole liquid fuel.

Within the scope of conventional refining processes are 'upgrading', 'topping' or 'hydroskimming' facilities. With crude upgraders, a primary objective is converting normally very heavy, highly viscous or solids-entrained materials so they can be re-processed in existing conventional refineries that process lighter, flowable materials to make a full range of fuel products, chemical feedstocks and/or petroleum coke. The upgraders are merely converting heavier to lighter density crude for feed conventional refineries that are individually designed to address sulfur to meet each of their respective downstream product specifications and reduction of sulfur or elimination of metals is not a primary objective of upgraders. The goal is upgrading source materials having extremely high densities compared to typical lower density crude sources. Heavier materials are rejected or separated out of sourced substances so resulting densities of upgraded product materials approach densities of crudes processed by existing conventional refinery equipment configurations. With regard to topping or 'mini' refineries, such are often located in remote or crude source opportunistic locations. Topping refineries typically split each barrel of crude feed into multiple straight run fractions targeted for naphtha, not gasoline production, with no or minimal subsequent processing except, in some limited cases, naphtha reforming for gasoline octane enhancement and hydrotreating multiple distillates to produce a variety of products. A typical topping refinery objective is to make a wide range of directly usable fuel usable products, such as gasoline, kerosene, diesel and fuel oil for local markets' consumption. In some undesirable practices of topping and use of their products or their failure to properly address residuals, harmful emissions to the environment are increased, not decreased. With hydroskimming refineries, crude is converted to multiple products akin to topping refineries, but typically with the limited addition of heavy naphtha reformers that also generate hydrogen which is consumed by hydrotreaters in producing diesels. Hydroskimmers, like topping refineries, typically make a wide range of gasoline, kerosene, diesel and fuel oil for local consumption, not just one product.

Various aspects of adapting hydrotreating, including having separate series or parallel hydrotreating reactor zones or having integrated hydrotreating reactor zones, are known in art. PCT/US1999/00478(1998) published by Cash et al, and the references cited therein, disclose integrated hydrotreating of dissimilar feeds, where hydrogen-containing and liquids-containing streams from separate hydrotreating zones are shared or combined in the manner disclosed therein. Various aspects of use of solvent separation, to extract deasphalted oil from pitch within heavy residual streams, and use the deasphalted oil as feed to hydrotreating are known in art when used to produce multiple product streams. For example, U.S Pat. No. 7,686,941 (2010) to Brierley et al discusses solvent deasphalting for production of deasphalted oil, without cracking or degradation by separation of the feed based on solubility in a liquid solvent, such as propane or other paraffinic solvent such butane, pentane and others up to and including to heptane. The pitch remaining contains a high metals and sulfur content. The deasphalted oil can be hydrotreated for sulfur, nitrogen, concarbon and metals removal as discussed in such reference for production of several products including naphtha, kerosene, diesel and a residual material.

The global market needs to have available bulk quantities of fuels low in sulfur and nitrogen and essentially free of metal contaminants to address global environmental issues on the open seas or at on-shore locations having little or no natural gas resources where high sulfur fuel oil or raw crude is used at low efficiency for power generation.

Fuel producers need designs, which are different than those that have evolved for conventional refining to produce multiple product slates. To keep costs low, the designs should be equipped, in a low capital investment manner, only with apparatus essential make bulk quantities of clean fuels in a cost effective and thermally efficient manner. The designs should be targeted to make primarily marine fuel, not merely extract a relatively small fraction of each barrel of crude for marine fuels and not use the larger portion of the barrel for other applications.

What the world needs is a "game changer" novel process that provides a solution to technical problems on how to make large quantities of relatively clean liquid fuels (in an efficient form for use to avoid waste of energy expressed in short form as British Thermal Units (BTUs) in an economical manner for marine applications. Such process should have minimal required infrastructure and associated capital and operating costs since existing liquids-based marine fueling stations (for illustration those supplying high sulfur fuel oil (HSFO)) spread all over the world can be used for distribution of such fuels in lieu of having to create new infrastructures for LNG. Any such new process should directionally support making liquid BTUs available cost effectively compared to ultralow sulfur diesel (ULSD) produced primarily for automotive and truck use, which diesel available is widely available, but not used widely at sea by large marine transport carriers due to cost and lubricity issues when ULSD is used in many existing marine diesel engines.

BRIEF SUMMARY OF THE INVENTION

This invention fills a gap in effective fuels production technology enabling low cost supply of large quantities of fuels having very low sulfur, nitrogen, and essentially metals free, particularly useful offshore in marine applications as well as in large scale onshore applications such as combustion gas turbines for power generation. As used in the specification and claims, the terms "essentially metal free" or "zero metals" means metals content of in range of zero to less than 100 ppbwt (parts per billion) or less or a content which is so low that it is difficult to measure reliably by conventional online instrumentation.

In conventional refining, crude oil feed is cut into many pieces, and each piece is sent down a separate market path. Opposite thereto, we have found that we can convert a maximum amount of each barrel of crude oil feed to a single ultraclean fuel, while capturing contaminant sulfur, nitrogen and noxious metals, save and except crude portions which provide process utilities and streams for such conversion and capture. This invention cuts crude oil feed into only a minimum number of pieces required for contaminant capture and control, then reassembles the pieces to form one fuel product.

Thus, this invention is unlike conventional refining which splits each barrel of crude feed to address multiple markets such as gasolines, diesels, fuel oils or feedstocks for downstream chemical production or applications, processes of this invention target making just one primary clean fuel product. This invention provides a low cost polishing system for crude and residual oils which is needed to make large commercial quantities of clean fuels that replace high sulfur bunker fuels and other heavy residuals used in commercial transport ships and power plant combustion systems. This invention provides those fuels, and methods and apparatus for making such fuels, to reduce sulfur in a cost efficient manner.

These novel processes use counter-intuitive steps to lower production costs, while controlling final product sulfur content at or below target sulfur levels in a surprisingly effective manner. This invention provides novel methods to convert the maximum amount of each barrel of crude oil feed to a single ultraclean fuel, while simultaneously capturing contaminant sulfur, nitrogen and noxious metals during fuel production.

In many variations of this invention, essentially all, characterized in certain variations as ninety (90%) by volume or more of each barrel of feed is converted to such single fuel, and in such variations only a minimal amount, being less than about ten percent (10%), of each barrel of crude is consumed for process utilities and streams for such conversion and capture of contaminants. The processes of this invention enable adjustment of the percentage of feed allocated to fuel product and that allocated for process utilities and streams for conversion and capture of contaminants, for purposes of hydrogen balance, local demand for asphalt, coke and other residual products, overall production economics and other operating considerations such as local availability of alternative lower cost process fuels and power. In variations, at least seventy percent (70%) by volume of each barrel of crude oil feed is converted to liquid fractions, when subsequently treated or untreated but combined, to form substantially one liquid fuel product, not multiple hydrocarbon products, having a sulfur content not exceeding a target sulfur content and the remaining portion of each barrel of said crude oil feed is in residue or other steams or products.

Unlike conventional refining where crude oil feed is cut into many pieces, and each piece is sent down a separate market path, this invention cuts crude oil feed into only a minimum number of pieces required for contaminant capture and control, then reassembles the pieces to form one very low sulfur and nitrogen fuel product, with essentially metal free. The process and apparatus configurations of this invention enable low cost, efficient production of large quantities of low sulfur fuels needed for regulatory compliance in large-scale marine and land based turbine applications. These novel fuel arrangements have substantially lower capital and operating costs than those of alternative conventional crude oil refining and thereby produce large-scale quantities of fuels having very low sulfur, very low nitrogen, and essentially metals free, in an extremely cost efficient manner. These novel processes enable a very cost effective means to simplify the supply chain of energy from the oil field to ship engine or land based power plant.

For the shipping industry, the novel configurations of this invention provide low cost, low sulfur marine fuels in quantities needed to meet worldwide marine sulfur reduction goals. The novel fuel production methods and apparatus arrangements of this invention have substantially lower capital and operating costs than those of alternative conventional crude oil refining and thereby produce large-scale quantities of marine fuels having very low sulfur and essentially metals free, and very low nitrogen, in an extremely cost efficient manner.

The fuels of this invention replace low-grade heavy bunker oils high in sulfur and metals significantly reduce open sea emissions of SOx, NOx, CO2, soot, and noxious metals. In lieu of sulfur and metals going to the environment upon burning bunker oil, in practice of this invention, the sulfur, nitrogen and metals are captured and removed during fuel production in an environment friendly manner. In some embodiments, this invention provides certain low sulfur alternative fuels at lower cost than diesel yet these fuels have sufficient lubricity to avoid excessive wear of ships' engines, and these novel fuels can use existing bunkering fuel infrastructures compared to other alternatives without heating the fuel to make it flowable and hence reducing the energy consumed to heat up the fuel in tanks onshore or on the ship.

In one variation, the fuels of this invention also provide an alternative to firing crude oil or heavy residuals in large land based combustion turbines deployed by utilities, for illustration, single cycle or combined cycle power plants such as those producing electricity and desalinated water. Turbines firing the fuels of this invention have significantly less turbine exhaust gases emissions of NOx, SOx, CO2, soot, noxious metals, and other combustion byproducts, also less corrosion of hot zones or fouling under ash formation conditions, when firing a contaminated heavy crude or refinery residual oil, depending on feed source.

This invention relates to a focused conversion of a complex hydrocarbon feed to a single fuel product for use in combustion applications, such as by marine engines, combustion gas turbines, or fired heaters. In a basic embodiment of this invention, crude goes in front, single ultraclean product fuel comes out back with controlled low sulfur level and reduced nitrogen and eliminated metals. In variations, the feed to distillation can be one or more crudes, combined with one or more of high sulfur fuel oils or other heavier residual oils, with addition of light tight oils or high sulfur fuel oils, or both, as part of stream feed to one or more of the other unit operations such as vacuum distillation, solvent separation, hydrotreating or gasification.

In different usages in the art, the term "high sulfur fuel oil" or "HSFO" has been assigned different, often dissimilar, conflicting and confusing means in various technical articles, patents, and statutes, some of which change over time. As used in the specification and claims, "high sulfur fuel oil" or "HSFO" means any material used as fuel having a sulfur content in excess of 0.50% m/m (0.5 wt. %). As used herein, the terms "heavy oils", "heavy residual oil", "residuals", "residue" or "other heavier oils" include petroleum derived hydrocarbonaeous materials having a sulfur content in excess of 0.50% m/m (0.5 wt. %). The term "high sulfur" means above the target sulfur content limit or statutory sulfur limit where applicable, whichever is lower.

In preferred embodiments, sulfur content of final product fuel is controlled by combination of streams, having different sulfur content. In variations, each stream so combined is formed to interim target sulfur content by adjusting unit operation conditions and flow rates, by trimming addition or removal of very low sulfur streams, or by blending feeds of different sulfur content. Variations of this invention include, control of product sulfur levels by, optional feeding a selected crude with one or more of (i) other crudes, (ii) bunker fuels, (iii) high sulfur fuel oils or other distillates (iv) other high sulfur or metal contaminated residues from other sources. As used in the specification and claims, the terms "essentially metal free" or "zero metals" means metals content of zero to less than 100 ppbwt (parts per billion) or less or a content which is so low that it is difficult to measure reliably by conventional online instrumentation.

We have discovered that we can optimize production of low sulfur fuels by addressing different crude feed sulfur content distributions.

We can address (i) when only relatively small portions of sulfur in basic H2S or RSH thiol type basic forms of sulfur are present in certain fraction and (ii) when relatively high portions of sulfur in more complex organic structure forms are present, and then can adjust process flow rates and operating conditions based a predicted breakpoint fraction at an upper or higher level at which sulfur content begins to increase more rapidly, maybe even exponentially, than over lower fractional levels.

We have found we can arrange process and apparatus configurations to enable bypassing treatment of certain streams and maximize that bypass, and avoid or reduce treatment of streams containing basic less complex sulfur forms and treat streams containing more complex forms differently. This can include selectively excluding from hydro desulfurization certain streams and for other streams, feed same to different hydrotreaters and adjust different hydrotreating unit conditions or adjust removal by solvent and/or reactive chemical based treatment by more than one solvents or other removal agents in one or more removal units where each ratio of removal agents in each unit is adjusted based on sulfur distribution to each unit to selectively remove less or more complex sulfur containing molecules.

The terms "kerosene" and "light distillate" are often assigned the same, overlapping or even different meanings in different reference materials but are uniformly defined only based on atmospheric crude tower cut points of temperature intervals (such as from 190° C. to 250° C. or 180° C. to 230° C. or whatever), and are not defined based on sulfur content. Instead, convenient sulfur content measurements are taken and reported based on the cut point temperature intervals which are dictated by specification for every product from a conventional refinery. We have found that to be less than optimum.

We have discovered that we can optimize lowering costs of low sulfur fuel production if we change the basic manner in which crude distillation towers operate. We have found that we should base certain distillation cuts upon sulfur content of the sidestream, reflecting on the assay of sulfur content of the crude feed or feed mix to tower, not upon standard product temperature range specifications for downstream historical uses such kerosene, jet fuel, diesel or the like We have discovered how to define "breakpoint" to address the point at which the change (rise over run) in sulfur content per change in unit volume of cut produced is no longer substantially flat, but instead at the breakpoint, as the amount of the cut is slightly increased, the sulfur content starts to rapidly increase, or increases exponentially, such as high change rate of rise over per unit run. Also at or after the breakpoint, depending on the type of crude feed, typically the type and composition, as well as complexity, of the sulfur containing compound change. The breakpoint is a guide from separation of streams, or portions of streams, which need desulfurization from those for which desulfurization can be minimized or eliminated.

We found we can minimize the capital and production costs of low sulfur fuels if we maximize production of the amount total liquids having a sulfur content at or below breakpoint cut so as to directly cut and collect such maximum amount of materials having a sulfur content at or below the breakpoint and avoid or reduce the costs of their downstream treatment for sulfur reduction or removal.

We discovered that relatively large volumes of such materials at or below the breakpoint, and in some crudes, those portions within a narrow certain zone above the breakpoint, will not need treatment or subsequent significant treatment for sulfur removal when combined with other cuts which have been treated for sulfur removal. We maximize such production of untreated materials to reduce overall stream desulfurization or other treating operating costs by pushing atmospheric distillation conditions, primarily through feed or tower temperature profile increase, but also by reduction or elimination of reflux or reduction of crude feed rate or mix or diluting feed crude to change crude hydrocarbon or sulfur composition so as to maximize the amount of cuts up to near or at the breakpoint. The breakpoint is not defined in terms of standard industry classifications or regulations setting temperature ranges of cuts.

We define the "breakpoint", for purposes of the specifications and claims, in reference to an assay of crude, or other determination method, as plotted with % mass or volume of crude as the x-axis, with sulfur content as the y-axis, to be the point at which sulfur content begins to rapidly increase from at or near horizontal, or increases exponentially, in terms of high change rate of rise over per unit run, where delta for the run is change in unit volume of fraction and delta for rise is change in unit of sulfur content and slope is the rise over run. The slope of such rise over run starts from near zero or horizontal, rapidly moves over 0.2 to quickly over 1 moves toward somewhat exponential break out increases in sulfur content, the breakpoint will vary based on crude or other feed to the distillation column. The "breakpoint cut" or "sulfur breakpoint cut, thus addresses a means to determine the split in hydrocarbon containing liquids, which boil above the end point of the range for naphtha, for illustration above the end of range for unstabilized wild straight run naphtha, but below or at the breakpoint, which as noted is the point at which sulfur content begins to rapidly increase, or increases exponentially, in terms of high change rate of rise over per unit run.

We define base "breakpoint cut" or base "sulfur breakpoint cut" for purposes of the specification and claims, to mean, with reference to the sulfur content of a fraction, hydrocarbon containing liquids boiling above the end point of the range for unstabilized wild straight run naphtha but below or at the breakpoint, where such breakpoint is selected so that when a fuel product stream is formed from combination of all untreated streams at or below the breakpoint and all streams above the breakpoint cut selected to be added to such combination, the combination fuel has an actual sulfur content that does not exceed a target sulfur content. In variations, a fuel can be produced in accordance wherein the target sulfur content is the sulfur breakpoint, or is higher or lower than the sulfur breakpoint, and the combination of streams forming the fuel are made efficiently with reference to the breakpoint so that actual sulfur content of said fuel does not exceed the sulfur target.

For many crudes, sulfur breakpoint cut for an atmospheric distillation column would include much of kerosene range materials (which are defined in various ways in the art) such as those boiling beginning at 180° C. or 190° C. (or other kerosene range start point) and for simplification, such could include lower or higher range temperature materials. However, sulfur content, not temperature nor historical definitions of kerosene range materials, is the determinative of the end point of the sulfur breakpoint range. A fuel can be produced in accordance wherein the target sulfur content is the sulfur breakpoint, and the combination of streams forming the fuel are made so that actual sulfur content of said fuel does not exceed the sulfur target.

In one embodiment, crude feed is separated into streams, one or more liquid portions of such separate streams are treated, while other portions are untreated. Then a majority of the volumes of all treated and untreated liquid streams are recombined to form a liquid fuel having an actual sulfur content at or below a target sulfur content. Process steps comprise (a) separating the crude by one or more distillation and solvent separation steps, into light overhead still gases, metals enriched residue insoluble in one or more solvents used for said solvent separation, gases comprising sulfur, and liquid fractions above sulfur breakpoint and liquid fractions at or below breakpoint, (b) treating, by one or more hydrotreating steps, liquid fractions over sulfur breakpoint, but not liquid fractions at or below sulfur breakpoint or insoluble residue, to form one or more hydrotreated streams having reduced sulfur content, yet leaving other portions untreated and (c) combining said hydrotreated streams with liquid fractions at or below breakpoint to form said fuel having an actual sulfur content at or below the sulfur breakpoint as target sulfur content.

In yet a different embodiment, this invention provides a process for reducing emissions over IMO specifications by a ship at open sea, or in an ECA, or in port, by use of a fuel produced in accordance with this invention which has a sulfur content adjusted to less than the maximum applicable IMO specification at the location of use of said fuel by said ship, whether at sea, or in an ECA, or in port. In this manner, a ship can exceed IMO requirements and public expectations.

In another embodiment, this invention provides a method for ships to use the fuels of this invention while in port to generate and sell electricity to land based electrical grids, for example, to offset at sea or in port fuel costs.

We have discovered that we can produce a low cost ultraclean marine fuel, while considering and adjusting flashpoint in an appropriate manner, and significantly exceed IMO expectations for limits on sulfur and metals.

We have thus discovered technical methods to trade (i) insignificant flashpoint changes for (ii) massive environmental benefits (enormous SOx and NOx reductions and essentially elimination of noxious metals) especially in relation to large quantities of fuels consumed by gigantic cargo vessels. Others failed to make that discovery.

The International Convention for the Safety of Life at Sea (SOLAS) overviews fuel flashpoints and permitted use on cargo ships. "Although to many the 60° C. minimum flashpoint for general service fuels given in the SOLAS Convention may seem one of the bed-rocks of marine legislation this only came in with the 1981 amendments. The first three SOLAS Conventions (1914, 1929 and 1948) had placed no limit on oil fuel flashpoint and even the 1960 Convention only required that for 'new' passenger ships that the fuel used by internal combustion engines was to have a flashpoint of not less than 43° C.—a provision essentially carried over to the current 1974 Convention as originally adopted," quoted from "Marine Distillate Oil Fuels Issues and implications associated with the harmonization of the minimum flashpoint requirement for marine distillate oil fuels with that of other users" (2012) authored by Wright et al. for the Danish Shipowners' Association by Lloyd's Register FOBAS.

Wright et al. noted that flashpoint is an empirical, not real world value and "flashpoint value does not, and never has, represented a 'safe'/'unsafe' boundary line.' "Consequently from the outset of the petroleum industry flashpoint has been used, somewhat incorrectly, as means of distinguishing between those products for which greater care and attention is required as to storage and use. In reality, in marine applications, an oil fuel fire is initiated through leakage or pipe failures allowing the fuel to come into contact with surfaces above its autoignition temperature rather by vapour ignition. Nevertheless, flashpoint has been used as a safety parameter in petroleum safety legislation from the outset albeit at times against somewhat arbitrarily set limits or due regard to the fact that it was an empirical value.

SOLAS creates an exception for cargo ships. SOLAS provides that no oil fuel with a flashpoint of less than 60° C. shall be used; except "in cargo ships the use of fuel having a lower flashpoint than otherwise specified in [SOLAS] paragraph 2.1 [e.g. 60° C.] for example crude oil, may be permitted provided that such fuel is not stored in any machinery space and subject to the approval by the Administration." It is noted certain countries do not have any flashpoint standard and other countries permit relatively low flashpoints in marine applications.

Fuel flashpoint can be adjusted by treatment, if needed. As used in the specification and claims, the term "flashpoint treatment" means a composition which when combined with a material increases the flashpoint. In one variation, the flashpoint treatment lower the vapor pressure of such material to which it is added to reduce risk of vapor ignition. In one variation, the flashpoint adjuster is a solid or liquid additive which has a flashpoint of 60° C. or over which is added to a low flashpoint fuel to increase the fuel's flashpoint. These can include various types of particulates and oils. For illustration, high flashpoint additives for treating carbon-based fuels have been disclosed, for illustration, including U.S. Pat. No. 8,088,184 (2014) to Hughes et al which discusses "high flashpoint diluents" such those selected from the group consisting of paraffinic base oils having a flashpoint of at least 200° C., and mixtures or combinations thereof, with specific mention of Calpar 100 (FP 210° C.), Calpar 325 (FP 240° C.), and Calpar P950 (FP 257° C.) available from Calumet Lubricants Co. of Indianapolis, Ind., and paraffinic base oils having a flashpoint of at least 200° C., and mixtures or combinations thereof.

We have discovered technical methods to trade (i) insignificant flashpoint changes for (ii) massive environmental benefits (enormous SOx and NOx reductions and essentially elimination of noxious metals) especially in relation to large quantities of fuels consumed by gigantic cargo vessels. Others failed to make that discovery.

DETAILED DESCRIPTION OF THE INVENTION

Figure 1:
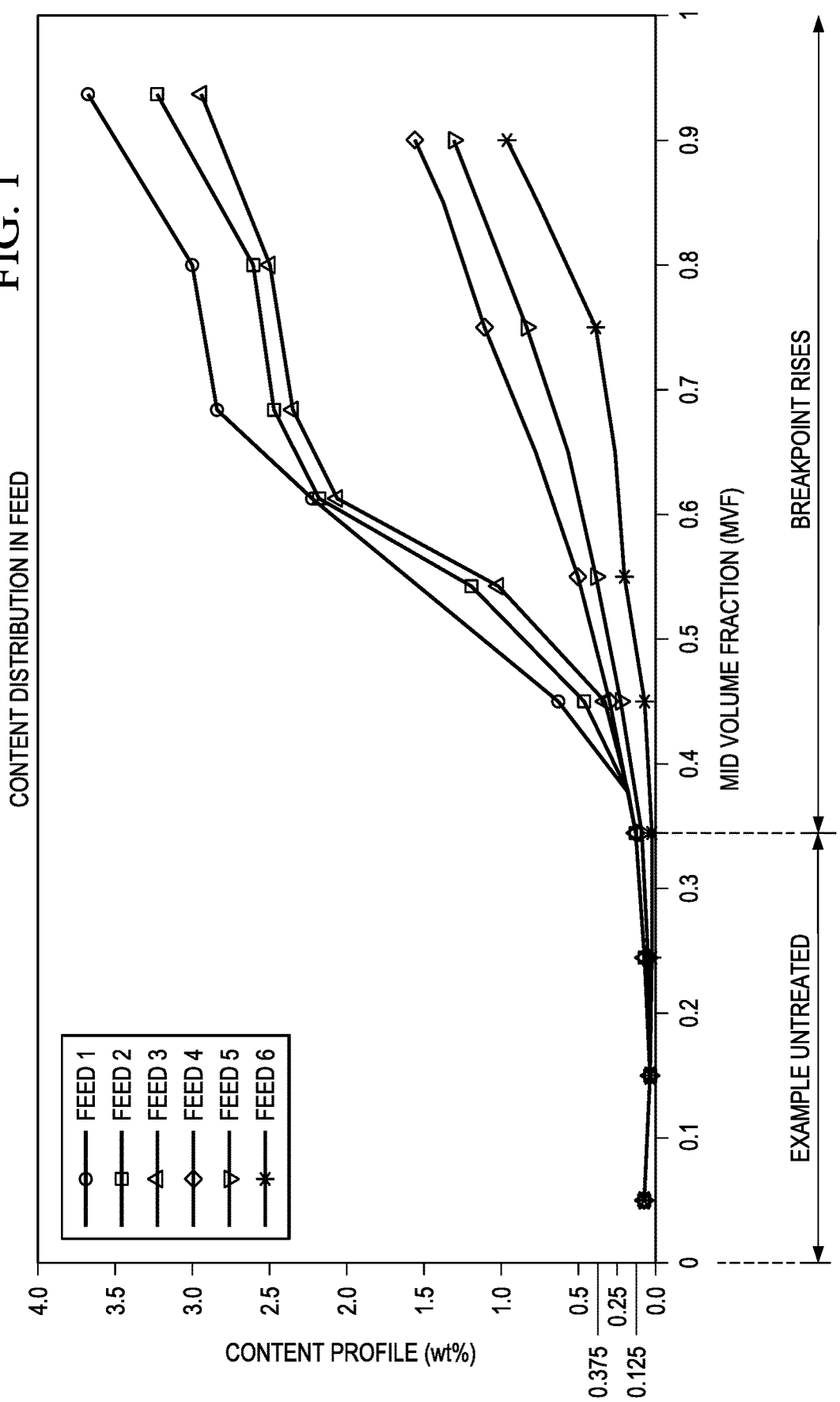
FIG. 1 is a schematic representation of sulfur content of various actual and hypothetical crude oils showing breakpoint ranges.

In one embodiment of this invention, a process for conversion of a hydrocarbon feed, at least a portion which is crude oil comprising sulfur and metals, to a single liquid product comprises (i) separating said feed by one or more distillation and solvent separation steps, into light overhead still gases (which can include only still gases not condensable at atmospheric distillation conditions as per EIA definition or more, whether or not a debutanizer systems is preferred for specific local considerations or its costs to be eliminated in other situations), metals enriched residue insoluble in one or more solvents used for said solvent separation, gases comprising sulfur, and liquid fractions, comprising sulfur, which comprise distillate (with at least some portion of kerosene range materials for some feeds being treated as within distillate range) and vacuum gas oil range hydrocarbons, (ii) hydrotreating, by one or more hydrotreating steps, selected liquid fractions over sulfur breakpoint cut (where preferably only soluble liquid fractions are selected for hydrotreating), but not liquid fractions at or below sulfur breakpoint cut (and preferably not those portions of any fractions which are insoluble in said solvents used in solvent separation), to form one or more treated streams having reduced sulfur content, (iii) combining said untreated fractions with said treated streams to form a fuel having an actual sulfur content at or below a target sulfur content. As used herein, the term "steps" or "zone" can refer to a unit operation or area having one or more process operations having equipment configurations and/or one or more segments of a unit operation or a sub-zone. Equipment items can comprise one or more tanks, vessels, distillation columns, separators, reactors or reactor vessels, heaters, exchangers, strippers, pipes, pumps, compressors, and controllers. In preferred variations of this invention, substantially all hydrocarbon compositions of said feed are separated into fractions but are subsequently recombined to form said fuel which is one liquid fuel product comprising a range of hydrocarbons from original feed liquefied petroleum gas, or in one variation, naphtha to hydrotreated deasphalted oil and is not multiple hydrocarbon products, except hydrocarbon compositions comprising those within (i) lighter overhead gases of distillation, (ii) said residue insolubles and (iii) streams for sulfur or metals recovery. Such range is substantially the entire range of crude oil derived hydrocarbons from C3 or C5 to greater than C20, said hydrocarbons having an initial boiling point being the lowest boiling point of any fraction within untreated streams combined in said fuel and highest boiling point being the highest boiling point of a treated stream combined in said fuel. The term "untreated" as used in the specifications and claims means not subjected to hydrotreating to reduce or remove sulfur, nitrogen or metals. In one variation, such fuel comprises substantially a range of crude derived hydrocarbons from C3 or C5 to greater than C20 or those comprising those having an initial boiling point in the range about 35° C. to about 315° C. and higher, preferably up to the initial boiling point of the end of deasphalted oil and start of deasphalted residue, which is not soluble in solvent selected for solvent separation. In still more preferred variations, a fuel of this invention comprises a combination of hydrocarbons ranging from the lowest boiling portion of said untreated liquid fraction from atmospheric distillation to highest boiling portion of hydrotreated solubles from solvent separation. Thus, preferred fuel of this invention is opposite to conventional gasolines, diesels, kerosenes, and fuels oils which have been cut into select sub-ranges and do not have meaningful content of full ranges of such hydrocarbons. Thus one embodiment of this invention is a fuel derived as a single product of processing crude oil, said fuel having an actual sulfur content of 0.5 wt. % or less, preferably 0.1 wt. % or less, comprising the substantially the entire range of crude oil derived hydrocarbons from C3 or C5 to greater than C20, said hydrocarbons having an initial boiling point being the lowest boiling point of any fraction of said crude oil at atmospheric distillation conditions and highest boiling point being the final boiling point of the residual portion of said crude oil which is not soluble in a solvent suitable for solvent separation. In variation, such fuel comprises substantially the entire range of crude oil derived hydrocarbons from C3 or C5 to greater than C20, said hydrocarbons having an initial boiling point being the lowest boiling point of any fraction within untreated streams combined in said fuel and final boiling point being the highest boiling point of a treated stream combined in said fuel. In one variation, crude is separated into light overhead still gases, metals enriched residue insoluble in one or more solvents used for said solvent separation, gases comprising sulfur (including purge gases comprising sulfur), and liquid fractions comprising sulfur comprising (i) liquid fractions at or below sulfur breakpoint and (ii) liquid fractions over sulfur breakpoint, which are either soluble or not soluble in solvent used in solvent separation (b) hydrotreated, by one or more hydrotreating steps, said soluble liquid fractions over sulfur breakpoint, but not liquid fractions at or below sulfur breakpoint or insoluble fractions, to form one or more treated streams having reduced sulfur content, (c) combining said untreated fractions with said treated streams to form a fuel having an actual sulfur content at or below a target sulfur content.

In variations, such residue is fired in one or more gasifiers for generation of electricity and at least a portion of hydrogen for said hydrotreating and for capture at least a portion of said metals in gasifier solids which are removed or the residue is fired in one or more boilers having flue gas sulfur and metals capture, for generation of electricity and an ancillary hydrogen generation unit operations for supply of hydrogen for said hydrotreating. Preferably and all gases comprising sulfur are directed to one or more common sulfur recovery units.

By practice of this invention, the actual sulfur content of said fuel can be adjusted to meet a target sulfur content limit specification, for example an IMO specification for a marine fuel or a sulfur limit for combustion gas turbine, by adjusting the amount of continuous flow of untreated and treated streams to the combination forming the fuel. For illustration, the target sulfur content of fuel can be adjusted to meet one or more target IMO specifications, for within or outside an ECA, for example, selected from 3.5 wt. %, 0.5 wt. %, 0.1 wt. % or other IMO specification. A fuel produced in accordance with the processes of this invention is useful in marine engines, combustion gas turbines, fired heaters such as boilers and other applications.

In one variation, at least one of said hydrotreated streams is an ultralow sulfur stream having 10 ppmwt or less of sulfur which is used to adjust, by reduction or addition of the amount of such stream to said combination, formation of said fuel having an actual sulfur content at or below a target sulfur content. In another variation, when at least one of the hydrotreated steams is an ultralow sulfur stream having less than 10 ppmwt of sulfur, and the untreated fraction has a sulfur content in excess of the target sulfur content and the untreated fraction is used as trim control, by reduction or addition of the amount of such untreated fraction to said combination, to form a fuel having an actual sulfur content at or below a target sulfur content. In yet another variation, wherein a crude oil feed is converted to substantially one liquid fuel product, not multiple hydrocarbon products, a first hydrotreated stream is produced which is a reduced sulfur stream having a sulfur content less than 10 ppmwt of sulfur, and a second hydrotreated fuel fractions is produced which has a reduced sulfur stream having a sulfur content in the range of 0.12 to 0.18 wt. % sulfur, and the untreated fraction has a sulfur content, either at or below or above the breakpoint sulfur, in excess of the target sulfur content and either said first hydrotreated stream or second hydrotreated stream, or both, are used as trim control, by reduction or addition of the amount of such steams to said combination, to form a fuel having an actual sulfur content at or below a target sulfur content.

In still more preferred embodiments, the sulfur contents of the one or more crude, residual oil and others feeds are selected, or processing conditions are adjusted, to where at least 70% by volume of each barrel of said crude oil feed is converted to liquid fractions, when subsequently treated or untreated but combined, form the product fuel having sulfur not exceeding a target sulfur content not multiple hydrocarbon products, having a sulfur content not exceeding a target sulfur content and no more than 30% of each barrel of said crude oil feed is directed to other than the fuel. In preferred variations of this invention, at least 80% by volume of each barrel feed, and more preferably near 90% or more of feed depending on feed composition, hydrogen balances, process economics and other factors, as well as adjustment of process operating conditions and flow rates, of each barrel of hydrocarbonaeous feed is converted to one liquid fuel product, not multiple hydrocarbon products, except one or more very low sulfur streams that are used as trim to control, by increasing or decreasing trim flow, the final fuel product sulfur content to a level not exceeding target sulfur content. Excess amounts of a trim stream can be separately transferred for material balance and inventory control purposes. In such preferred variations of this invention, no more than about 10% to 30% by volume of each barrel of said crude oil feed is captured in metal enriched residue, post atmospheric and vacuum distillation via solvent extraction.

In another variation, a high sulfur fuel oil having a sulfur content greater than the target sulfur content is added, either alone or with a light tight oil, before or during combining all treated and untreated fractions to form said fuel. Said high sulfur fuel oil can be fed to one or more of said distillation step, solvent separation step or hydrotreating step. In one preferred embodiment, an ultralow sulfur stream has in the range of less then 10 ppmwt or less of sulfur, and the untreated fraction has a sulfur content in excess of the target sulfur content and said untreated fraction is used to adjust, by reduction or addition of the amount of such untreated fraction to said combination, to form the product fuel having an actual sulfur content at or below a target sulfur content.

The apparatus for practice of the process of this invention can have a reduced equipment footprint, in the range of 20% to 30% the apparatus footprint of conventional refinery that has typical downstream processing units. Thus capital costs per barrel of feed treated are substantially reduced. For example, one specific embodiment of this invention employs only one or more of atmospheric distillation, vacuum distillation, solvent separation, hydrotreating and gasification, with required ancillary apparatus for capture of sulfur and metals and do not have any hydrocarbon treating operations downstream of hydrotreating except gasification with required ancillary apparatus for capture of sulfur and metals.

Variations of process configurations of this invention provide high efficiency, low cost operation by effective integration of a utility island to supply process needs for hydrogen, steam, and fuel gas, as well as electricity, while also providing integrated metals and sulfur capture means. The utility island comprises one or more gasifier systems treat heavy metals enriched residue to capture and eliminate metals contaminants as a component of potential air emission sources and preferably use an integrated, thus lower capital cost, off gas treatment of sour gas and acid gas from all sources for sulfur capture, treatment and removal as potential emission sources. The island configuration of this invention produces hydrogen for hydrotreating steps, steam and fuel gas for process electrical and the process electrical via a high efficiency combined cycle power generation means utilizing certain streams, that would otherwise be waste streams, to fulfill process requirements.

One variation of this embodiment of this invention addresses when a light tight oil does not contain sufficient heavier hydrocarbons within its bottoms fractions and residuals to providing processing balance for hydrocarbon treatment and corresponding hydrogen generation to enable processing such light crude to hydrogenate to lower sulfur and metals for decontamination. This method includes the step of adding said light crude, either separately or mixed with other feeds, to any or all of the heavier feeds to atmospheric distillation, vacuum distillation or solvent separation of treatments.

In one variation, designs for apparatus for vacuum distillation, solvent separation, hydrotreating and gasification operations downstream of atmospheric distillation are sized to have added or spare capability to process high sulfur fuel oil or additional heavier residue sourced from a different source outside the battery limits of said operations to form a fuel having an actual sulfur content at or below a target fuel sulfur content limit level and capture at least a portion of the sulfur and metals from said additional heavy residue.

In another embodiment, this invention provides a method for ships to use the fuels of this invention while in port to reduce local emissions, as well as generate and sell electricity to land based electrical grids. In one variation, this invention provides a technical method for reducing emissions at or near locations of ports comprising (a) technical analysis to ascertain per kilowatt per hour (KWH) amount of sulfur or metals emissions results from on-shore generation facilities that generate electricity normally supplied to the electrical grid at or near location of port (including for illustrations, emissions associated use of local electrical supply by a ship when in port and connected to such grid) and (b) technical analysis to ascertain per KWH amount of sulfur or metals emissions resulting from on-board ship electricity generation by the same ship when in port at the location of (a), then compare (a) and (b) and if (b) emissions generated by the ship for electricity generation are lower than local sources of power of (a), then emissions are reduced in the ship tender all or portion of on-board electricity generation to the grid. This embodiment may be particularly useful to reduce environmental emissions when locally supplied electricity is from certain types of coal fired sources or heavy crude or residual oils are used to fire electricity generation, where options for lower emissions are not available for local electrical generation. Absent offsets, such tender by ship to local grid would likely not be made if KWH cost of ship generated power is more than KWH cost of local grid power or if such tender by ship to local grid is otherwise not profitable to the ship, save and except an offset of port fees or other unless offset by emissions reduction credit such as a subsidy to pay for low emission power generation.

If the tender by the ship to local grid is profitable, then the ship can offset or reduce fuel costs incurred while at sea via revenues generated by tender to grid on shore while in port of all or portion of on-board electricity generated by use a fuel of this invention while in port. Such revenue generated by tender to grid while at port can offset voyage at sea fuel costs to a level that could lead to actual voyage at sea fuel costs with these novel fuels being lower than costs of high sulfur fuel oil for voyage at sea, depending on stop duration at port.

FIG. 1 is a schematic of a plot of sulfur content of various actual and hypothetical crude oils showing breakpoint ranges. The exemplary crude sulfur profiles 4,5,6 are plotted based on center points of actual data extracted from publication entitled Sulfur Compounds in Crude Oil, Washington D.C., published by UNT by Rall et al. The crude sulfur hypothetical profiles 1,2,3 are derived in part from actual data adapted from various sources, including Petroleum Refining, Crude Oil Petroleum Products Process Flowsheets (1995) by J. P. Wauquier, published by Institut Francais du Petrole.

FIG. 1 illustrates how to suggest a "breakpoint" definition for different crudes for the process configurations of this invention. FIG. 1 is illustrative of breakpoints is the point at which the change (rise over run) in sulfur content per change in unit volume of cut produced is no longer substantially horizontal or flat, but instead at the breakpoint, as the amount of the cut is slightly increased, the sulfur content starts to rapidly increase, or increases exponentially, to cause a high change in rate of rise over per unit run. Also at or after the breakpoint, depending on the type of crude feed, the type and composition, as well as complexity, of the sulfur containing compounds change. The breakpoint enables determination, for operating efficiency, of how best to bypass cost intensive hydrotreating, yet produce fuels meeting target sulfur content limit specifications. That is breakpoint can be the maximum sulfur content of atmospheric crude tower fraction which is directed away from, or reduced from, further downstream processing to reduce sulfur content, such as being directed away from hydrotreating. Fractions above the breakpoint are directed to downstream processing to reduce sulfur content while the fractions at or below the breakpoint are untreated, resulting in substantial operations savings. In conventional refining, cuts are fixed by temperature ranges, not sulfur content. The target sulfur content, for illustration an end use requirement, can determine selection of the breakpoint. If breakpoint is set too high, then excessive flows of higher sulfur untreated streams cannot be offset readily by increased flows of lower sulfur hydrotreated streams.

Figure 2:
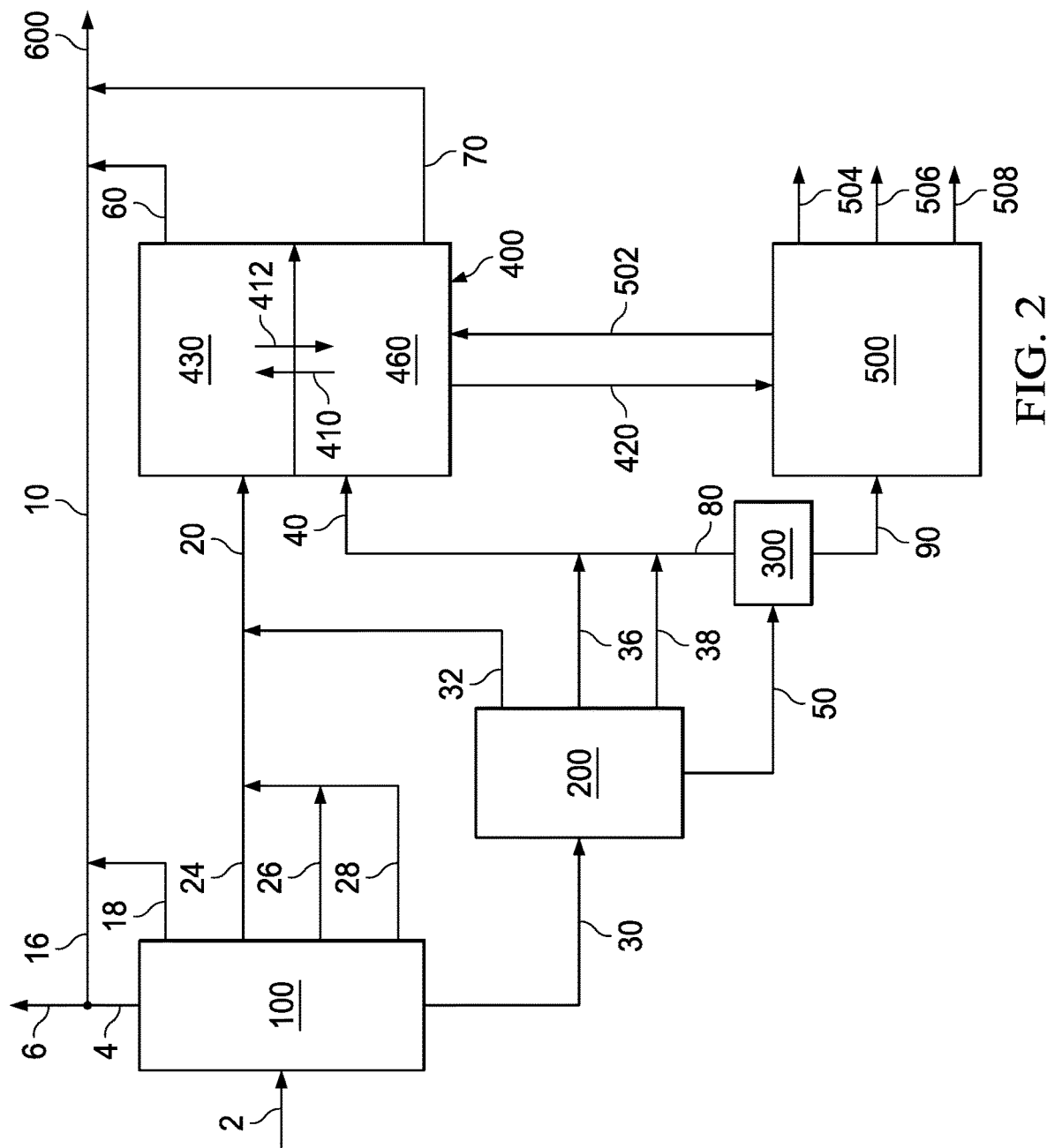
FIG. 2 is a schematic drawing of a process arrangement for treatment of crude oil to produce a single liquid product useful as a fuel in accordance with this invention.

FIG. 2 gives a general overview of another embodiment of this invention and shows in simplified form the major components of process operation for production of a single liquid product suitable for use as a fuel. FIG. 2 shows a process for integration of atmospheric and vacuum distillation, solvent separation, hydrotreating and gasification to produce a single low sulfur, essentially metals free fuel product.

A stream of contaminated crude oil comprising sulfur, nitrogen and metals enters the process via line 2 after pretreatment such as desalting, which is preferred for crude oil. In this example, the crude feed 2 can be a single crude oil or blends of one or more crude oils or a blend of a crude oil with a residual oil such as high sulfur fuel oil. The feed 2 is directed to an atmospheric distillation column 100, where the feed is separated into light overhead gases 4 and multiple cuts. The light overhead gases 4 include non-condensable still gases 6 useful as process fuels or can be captured for other uses. In one preferred variation, capital expenditures associated with a stabilization system are avoided with respect such overhead gases 4; however, depending on local needs, for example a special marine fuel maximum H2S specification, a stabilization system can be included. In an embodiment shown in FIG. 2, the multiple cuts would include one or more of streams within these ranges (1) unstabilized wild straight run naphtha via line 4 at line 16, (2) sulfur breakpoint cut at line 18, (3) light distillate at line 24, (4) medium distillate at line 26, (5) a first heavy distillate at line 28, (6) atmospheric residual at line 30.

In different usages in the art, different meanings have assigned to the same or similar cuts in different regions of the world, which meanings are often dissimilar, overlapping, conflicting and confusing means. As used in the specification and claims, the following means are assigned: (a) "naphtha" means carbon containing compositions ranging from those having a minimum of three (3) carbons C3 such as propane to those having an initial boiling point (IBP) of about 175° C. (about 350° F.), without lighter boiling compounds, such as methane or lighter, (b) "stabilized naphtha" means, as such pertains to naphtha or other naphtha range materials used as a fuel blend stock, that lighter boiling compounds, such as butane or propane or lighter, have been almost completely removed from the naphtha or fuel, where for illustration, in a conventional refinery, the bottoms stream from a naphtha debutanizer distillation tower would be a stabilized naphtha, (c) "unstabilized naphtha" means naphtha which has not had the C4 or lighter components removed; for illustration, in a conventional refinery, the feed stream to a naphtha debutanizer would be an unstabilized naphtha, (d) "unstabilized wild straight run naphtha" means carbon containing compositions recovered from atmospheric distillation ranging from those having a minimum of three (3) carbons C3 such as propane up to those having an initial boiling point (IBP) of about 175° C. (about 350° F.), without lighter boiling compounds, such as methane or lighter, of which atmospheric distillation overhead still gases may be comprised, (e) "wild naphtha", in the context of hydrotreating, means the unstabilized lighter fraction of hydrotreater effluent recovered from a fractionator, or other separator, operability considered a portion of a hydrotreating zone which recovers one or more heavier fractions at or near separator bottoms, such as distillate range, heavy oil range, or other heavier than naphtha portion of the feed to the separator and unstabilized, (f) "breakpoint cut" is defined herein above in this specification and an example is shown in FIG. 1, (g) "light distillate over breakpoint cut" or "light distillate" herein the fraction having an initial sulfur content over the highest sulfur content of the breakpoint cut, which correspondingly has an boiling point (IBP) of over the highest final boiling point of the breakpoint cut, (h) "medium distilliate" means a fraction between light distillate and heavy distillate, separated as cut based on preferred distillation column design; where for example, medium distillate cut could be eliminated and combined with either light distillate or heavy distillate, (i) "first heavy distillate" means the heaviest fraction of an atmospheric distillation unit, the sulfur content and boiling point range of which are determined by operating factors such as one or more of sulfur composition of distillation unit feed, crude tower operations severity and downstream hydrotreating conditions, (j) "first heavy distillate" means the heaviest fraction of an atmospheric distillation unit, having a sulfur content and boiling point range which are determined in reference to sulfur composition of distillation unit feed and the sulfur breakpoint cut and by reference to one or more operating factors such as crude tower operations severity and severity of downstream distillate hydrotreating conditions, (k) "second heavy distillate" means the lightest fraction of a vacuum distillation tower having a sulfur content and boiling point range which are determined in reference to sulfur composition of distillation unit feed and the sulfur breakpoint cut and by reference to one or more operating factors such as crude tower operations severity and severity of downstream distillate hydrotreating conditions, and (j) "atmospheric residual", "vacuum residual", "vacuum gas oil" including "light vacuum gas oil" and "heavy vacuum gas oil", "solvent separation" and "hydrotreating" and other terms, and variations in such terms, are known to those skilled in the art of processing crude oil.

Preferably, the combination of steams (1) unstabilized wild straight run naphtha via line 4 at line 16 and (2) sulfur breakpoint cut at line 18 would contain in the range of less than 0.06 wt. % sulfur to 0.08 wt. % sulfur if the fuel combination at 600 target sulfur content is 0.1 wt. % or less sulfur and treated stream 70 sulfur content is less than 10 ppmwt, where flow rates of steams 10 and 70 the combination are adjusted so that the fuel combination 600 does not exceed target sulfur content.

In FIG. 2, the atmospheric residual is fed via line 30 to a vacuum distillation tower 200 to produce (1) a second heavy distillate at line 32, (2) light vacuum gas oil at line 36, (3) heavy vacuum gas oil at line 38 and (4) vacuum residual at line 50. The vacuum residual is directed via line 50 to solvent separation 300 to produce (1) deasphalted oil at line 80 and a pitch, being pitch, which is a metals rich heavy residual at line 90.

FIG. 2 shows an integrated hydrotreater system 400 comprising two hydrotreating zones, a distillate hydrotreater zone 430 and a heavy oil hydrotreater zone 460. Integrated hydrogen treatment systems are known in the art, and are preferred for this application; however, mild hydrotreating conditions of relatively low pressures in the range of about 117 bar to 138 (1700 to 2000 psi) are sufficient for hydrodesulfurization and hydro-demetalization in both zones 430 and 460.

The light distillate 24, medium distillate 26, first heavy distillate 28 and second heavy distillate 32 are preferably fed to an integrated hydrotreater system 400 and treated with hydrogen in presence of catalyst at hydrotreating conditions to form distillate hydrotreater zone 430 effluent streams in line 60. Such hydrotreater effluent 60 comprises materials within ranges of (1) wild naphtha, with anticipated boiling range from above C5 (five carbons containing compositions) to about 175° C. (about 350° F.) and (2) ultra low sulfur diesel, preferably having a sulfur content of less than 10 ppmwt, being a reduced sulfur stream formed from combination of treated distillate steams comprising light distillate 24, medium distillate 26, first heavy distillate 28 and second heavy distillate 32. Those skilling in hydrotreating art understand that byproducts of hydrotreating in zone 430 may include gases containing sulfur such as hydrogen sulfide, hydrogen rich off gas, at least a portion of which is treated for sulfur removal and is recycled as hydrogen addition to either distillate hydrotreater zone 430 or heavy oil hydrotreater zone 460, or both, and a typically a minor amount of liquid petroleum gases.

The light vacuum gas oil 36, heavy vacuum gas oil 38 and deasphalted oil 80 are are preferably also fed to the integrated hydrotreater system 400 and treated with hydrogen in presence of catalyst at hydrotreating conditions to form heavy vacuum gas oil hydrotreated zone 460 effluent streams 70. Such hydrotreater effluent comprises materials within ranges of (1) wild naphtha, with anticipated boiling range from above C5 (five carbons containing compositions) to about 175° C. (about 350° F.) and (2) ultra low sulfur diesel, preferably having a sulfur content of less than 10 ppmwt, being a first heavy oil hydrotreating zone reduced sulfur stream formed from a first portion of the combination of treated distillate steams comprising light vacuum gas oil 36, heavy vacuum gas oil 38 and deasphalted oil 80, (3) a second reduced sulfur stream, preferably having a sulfur content in the range of 0.12 to 0.18 wt. % sulfur, being formed from a second portion of the combination of treated distillate steams comprising light vacuum gas oil 36, heavy vacuum gas oil 38 and deasphalted oil 80. Those skilling in hydrotreating art understand that byproducts of hydrotreating in zone 460 may include gases containing sulfur gases such as hydrogen sulfide, hydrogen rich off gas, at least a portion of which is treated for sulfur removal and is recycled as hydrogen addition to either distillate hydrotreater zone 430 or heavy oil hydrotreater zone 460, or both, and a typically a minor amount of liquid petroleum gases.

Untreated stream 10 and one or more the hydrotreated liquid streams via line 60 and line 70 are combined to form low sulfur essentially metals free fuel product at 600, where 'combine' means formed by in-line stream mixing, blending, or other intimate combination. In one variation, unstabilized wild straight run naphtha via 4 and 16 and sulfur breakpoint cut via 18 are combined in 100 without added treatment, then form fuel combination at 600 by combination with one or more of the effluents from the distillate hydrotreater zone 430 comprising wild naphtha and ultra low sulfur diesel and with one or more of effluents from heavy oil hydrotreater zone 460 comprising wild naphtha, ultra low sulfur diesel and a second reduced sulfur stream which is formed in the heavy oil hydrotreater zone 460. In another variation, with the hydrotreating zone 400, the effluents of zone 430 and 460 are combined to form a single stream as if line 60 and line 70 were combined (not shown) within such zone, with such variation being useful where separation of effluent of hydrotreaters 430 and 460 is not preferred. Preferably, the vacuum gas oil hydrotreating portion 460 has overhead system flow and bottom system flow, a portion which flows are a diesel boiling range material, that may be a relatively small amount compared to combined diesel contributed by zones 430 or 460 to the combination 600 and the combined diesel side hydrotreating portion 430 also have a wild naphtha side stream, either alone or part of an overhead system flow and bottom system flow including low sulfur diesel directed to block 600 or used as trim or other purposes.

The deasphalter 300 bottoms heavy residual 90 comprising asphalt and metals rich heavy residual is fed to an integrated gasification-combined cycle system 500 comprising one or more gasifiers for partial oxidation of said heavy residual 90 in presence of steam and oxygen and optionally carbon containing slurry quench, to form syngas, at least a portion of which is converted to hydrogen which is directed via line 502 for use in hydrotreater system 400 comprising distillate hydrotreater 430 and heavy oil hydrotreater 460 and syngas for firing a gas turbine of a combined cycle power unit within the gasification system 500 for electrical generation within 504 for process uses and other uses, and hot turbine gas, and also comprising a heat recovery generator to recover heat from hot gas turbine gas to produce steam which drives a steam turbine, for additional electricity generation directed as power via 504. Each gasifier also produces metals rich soot, which may be in the form of particulate solids, which comprises metal contaminants derived from the crude and/or heavy feeds, which solids are directed via line 506 from each gasifier for metals removal. Support systems comprise one or more gas treatment units to which all sulfur containing gas streams, whether sour gas or acid gas, from all unit operations are fed for sulfur removal via 508. Preferably such sulfur removal systems are part of the utilities island of which the gasification system is part. More preferably, one or more sulfur containing gas streams are directed to commercial sulfur acid production as part of overall sulfur removal. The gasification system 500 will typically include acid gas removal unit and sour CO-shift system that are optimized in capacity and configuration to produce the required hydrogen from at least a part of the raw syngas produced within the gasification system.

In the integrated hydrotreating system 400 variation shown by FIG. 2, make-up hydrogen containing gas 502 from gasification system 500 in quantities required for hydrotreating, along within internal recycle hydrogen within the hydrotreating block 400, is compressed and heated to effective hydrotreating operating temperatures, pressures, space velocities and pressures, which are adjusted based upon catalyst selected and other conditions as known in the art to achieve desired level of desulfurization and demetalization. Such prepared hydrogen 502 (along with recycle hydrogen) is deployed first in the heavy oil hydrotreater zone 460, the higher pressure zone. The effluent of the heavy oil hydrotreater zone 460 comprising hydrotreated liquids and a hydrogen containing gas are separated in a high pressure separator (not shown), with such liquids being collected within zone 460 and the hydrogen containing is recovered and passed via line 410 to the distillate hydrotreater 430 for hydrotreating use in such lower pressure zone. Hydrotreated liquids and purge gases comprising sour and acid gases from hydrotreater zone 430 are passed via line 412 to heavy oil hydrotreater zone 460, where such are substantially combined. The hydrotreated treated liquids of both zones 430 and 460 can be 430 and 460 can be segregated via lines 60 and 70 and separately used as inputs to the combination fuel 600 or be added as trim to control combination zone 600 sulfur level or be withdrawn (not shown), depending on process sulfur and material balance needs. In the integrated hydrotreating variation shown, the purge gases 420 of both zones 430 and 460 are directed via line 420 to utilities island 500 comprising sulfur recovery systems and optionally, gasification or boilers.

Not shown in FIG. 2, but known to those skilled in the hydrotreating art, are various ancillary high, medium and low pressure gas-liquid separators, stream heaters, gas recycle and purge lines, reflux drums for gases or lights and liquid separation, compressors, cooling systems, and other ancillary application. Also, if not within a common utilities island but instead are located within the hydrotreating zone, various amine or other sulfur recovery agent absorbers and stripping systems for sour gas or acid gas treatment would be included in hydrotreating zone 400.

Parameters for selection of hydrotreating catalyst and adjustment of process conditions of hydrotreating zone 400 are within the skill of a person engaged in the petroleum refining industry and should not require additional explanation for practice of the hydrotreating segments of this invention. In the reaction zones of the distillate hydrotreater 430 and the heavy oil hydrotreater 460 the hydrotreating catalysts employed include any catalyst composition useful catalyze the hydrogenation of a hydrocarbon feed to increase its hydrogen content and/or remove sulfur, nitrogen, oxygen, phosphorus, and metal heteroatom contaminants. Specific catalyst types and various layer configurations used and hydrotreating conditions selected will depend on the hydrocarbon composition, as well as sulfur and metals content and heavy carbon residue, of each feeds being processed by each respective unit, the desired reduced sulfur and metals content of the product stream from each zone. Such catalyst may be selected from any catalyst useful for the hydrotreating of a hydrocarbon feedstock; however, operating conditions are adjusted to avoid or minimize ring saturation or hydroconversion in the practice of preferred embodiments of this invention. Publication number US20140221713A1 (U.S. Ser. No. 13/758,429) 2014 by Baldassari et al, which is incorporated herein by reference describes various suitable hydrotreating catalyst as well suitable hydrotreating processes including variations of integrated hydrotreating apparatus. Baldassari et al further summaries variations of catalyst compositions and condition ranges for distillate and heavy oil hydrotreating and distinguish over conditions for hydrocracking and for residue hydroconversion, all of which are known those skilled in the art of hydroprocessing. "Revamping Diesel Hydrotreaters For Ultra-Low Sulfur Using IsoTherming Technology" by Ackerson et al discusses unit design, catalyst choices, hydrogen consumption, and other operating conditions for sulfur removal by hydrogenation to produce a product containing less than 8 ppm sulfur by use of a high activity Ni/Mo catalyst. "Optimizing Hydroprocessing Catalyst Systems for Hydrocracking and Diesel Hydrotreating Applications, Flexibility Through Catalyst" by Shiflet et al, page 6 Advanced Refining Technologies Catalagram Special Edition Issue No. 113/2013 also discusses hydroprocessing to 10 ppm or less levels using high activity CoMo catalyst to remove unhindered sulfur and a high activity NiMo catalyst for remaining sterically hindered sulfur.

In another variation illustrated by FIG. 2, sulfur content of feed 2 is measured by an assay which indicates the sulfur profile exponential breakpoint and rate of rise, for illustration a breakpoint of sulfur content in the range of 0.06 to 0.08 wt. % (or higher based on considerations of relative flow rates of untreated and hydrotreated steams and their respective sulfur contents) and use such profile to control adjustments to atmospheric distillation 100 to maximize the available amount of unstabilized wild straight run naphtha 16 and sulfur breakpoint cut 18 which can flow to combining by flow mixing or by blending at the product collection zone 600 available be without treatment and determine, or reduce if needed, the amount of (1) streams of light distillate 24, medium distillate 26, first heavy distillate 28 or second heavy distillate 32 to the distillate hydrotreater zone 430, or (2) streams light vacuum gas oil 36, heavy vacuum gas oil 38 or deasphalted oil 80 to heavy oil hydrotreater 460, which flows are directed to hydrotreating, in an increased or decreased amount for treatment to form a fuel product 600 having an actual sulfur content at or below a target sulfur content limit level. In yet another variation, the assay can be used to control the maximum amount of streams other than untreated unstabilized wild straight run naphtha 16 and untreated sulfur breakpoint cut 18 to determine the amount of streams to be directed to hydrotreating to form a fuel 600 having an actual sulfur content at or below a target sulfur content limit level. That is, the various rates of flow to hydrotreating 400 of any of amounts of (1) streams of light distillate 24, medium distillate 26, first heavy distillate 28 or second heavy distillate 32 to the distillate hydrotreater zone 430, or (2) streams light vacuum gas oil 36, heavy vacuum gas oil 38 or deasphalted oil 80 to heavy oil hydrotreater 460, can be increased or decreased amount to cause adjustment of sulfur content hydrotreating zone 400 effluents 60 or 70, or both, which is combined at 600 with untreated streams of 10.

In one variation, fuel product 600 having an actual sulfur content at or below a target sulfur content limit level is formed by adjustment of final actual product 600 sulfur level by increasing or decreasing amounts to combination zone 600 one or more of any of (a) unstabilized wild straight run naphtha 16 or sulfur breakpoint cut 18, each of which may contain some sulfur content because they are not treated for sulfur removal or (b) streams to or from distillate hydrotreater 430 such as those of treated light distillate 24, medium distillate 26, first heavy distillate 28 and second heavy distillate 32, or (c) streams to or from heavy oil hydrotreater such as those of treated light vacuum gas oil 36, heavy vacuum gas oil 38 and deasphalted oil 80, where such adjustment is based upon measurement of relative sulfur content contribution of each stream 60 or 70 to the combination 600.

In one embodiment, light tight oil or condensate, or a combination of light tight oil or the like such as non-associated gas and shale gas production condensate, having low metals content and a sulfur content less than the target sulfur content limit level for the fuel 600 is combined with one or more of (a) feeds to atmospheric distillation 100 or vacuum distillation 200, solvent separation 300, any of the feeds of light distillate 24, medium distillate 26, first heavy distillate 28 or second heavy distillate 32 to the distillate hydrotreater 430 or any of the feeds of light vacuum gas oil 36, heavy vacuum gas oil 38 or deasphalted oil 80 to heavy oil hydrotreater 460 to the heavy oil hydrotreater, or (b) stream 10 formed from unstabilized wild straight run naphtha 16 and sulfur breakpoint cut 18, without added treatment or (c) stream formed from distillate hydrotreater comprising wild naphtha and ultra low sulfur diesel, or (d) streams formed from heavy oil hydrotreater comprising wild naphtha, ultra low sulfur diesel and a second reduced sulfur stream or (e) combined effluent 70 of the hydrotreating unit 400 directed to the finished product fuel 600 or (f) otherwise added to a facility produced fuel within or outside the fence of the facility producing such fuel to form a finished product fuel.

In one variation shown in FIG. 2, the fuel product 600 sulfur content is controlled to be at or below a target sulfur content limit level by (a) feeding to the combination 600 unstabilized wild straight run naphtha 16 and sulfur breakpoint cut 18, without added treatment of either such stream via line 10, then (b) adjusting actual product sulfur level 600 by increasing or decreasing amounts to the combination of one or more of any of (1) streams of light distillate 24, medium distillate 26, first heavy distillate 28 or second heavy distillate 32 to the distillate hydrotreater zone 430, or (2) streams light vacuum gas oil 36, heavy vacuum gas oil 38 or deasphalted oil 80 to heavy oil hydrotreater 460, and (c) then decreasing amounts to the combination of one or more of any of (1) streams from distillate hydrotreater zone 430 via line 60 which was formed from light distillate 24, medium distillate 26, first heavy distillate 28 or second heavy distillate 32, (2) streams from heavy oil hydrotreater zone 460 via line 70 which was formed from light vacuum gas oil 36, heavy vacuum gas oil 38 and deasphalted oil 80, if any or all of such needed for any reason to increase the actual product 600 sulfur level to the target sulfur level, or (d) increasing amounts to the combination of one or more of any of (1) said streams from distillate hydrotreater 430 via line 60 or (2) streams from heavy oil hydrotreater 460 via line 70, if needed for any reason to decrease the actual product 600 sulfur content at or below the target sulfur content limit level. Multiple sulfur grades can be efficiently produced due to such facilitation, for example those fueled targeted for 500 ppmwt or less sulfur fuel for marine and land based gas turbines or differing ranges for the same applications at different locations requiring different target sulfur contents.

In variations for use of high sulfur fuel oil having a sulfur content greater than the target sulfur content limit level of finished fuel at combination 600, the high sulfur fuel oil is fed as part of one or more of the various feeds to one or more of each unit operation. High sulfur fuel oil can be added to (a) feed line 2 to atmospheric distillation 100 or line 30 to vacuum distillation 200, or (b) line 50 solvent separation 300, or (c) line 20 to distillate hydrotreater 430, either separately or combined with one or more of light distillate 24, medium distillate 26, first heavy distillate 26 or second heavy distillate 32 feeds to said distillate hydrotreater 430, or (d) line 40 to heavy oil hydrotreater 460, either separately or combined with one or more of light vacuum gas oil 36, heavy vacuum gas oil 38 and deasphalted oil 80, to form a fuel combination 600 having an actual sulfur content at or below a target sulfur content limit level. Those skilled in the refining art understand that in practice of one or more of these variations regarding use of a high sulfur fuel oil as feed and selection of its point of feed, consideration will be given to its sulfur content, asphaltene content and other factors pertaining to nature of the high sulfur fuel oil feed and compatibility with co-processed crude or other feeds, vessel space and energy consumption, asphaltene content, content of undissolved components, gum formation, and other efficiency issues.

In another variation, a clean fuel at combination 600 zone is formed by adding a high sulfur fuel oil, which can have a sulfur content greater than the target sulfur content limit level to one or more of (a) streams 10 formed from unstabilized wild straight run naphtha 16 and sulfur breakpoint cut 18 without added treatment, depending on sulfur content of high sulfur fuel oil or is added to (b) stream 60 formed from distillate hydrotreater 430 comprising wild naphtha and ultra low sulfur diesel range materials, or (c) stream 70 formed from heavy oil hydrotreater 460 comprising wild naphtha, ultra low sulfur diesel and a second reduced sulfur stream or the combination effluent 70 from hydrotreating zone 400, so that the fuel 600 has an actual sulfur content at or below a target sulfur content limit level.

In one preferred variation of use of a high sulfur fuel oil in making fuel composition 600, the sulfur content of such high sulfur fuel oil is determined, then the high sulfur fuel oil is either fed as part of the feed 50 to the solvent separation unit to form a portion of a deasphalted oil stream 80 or combined with one or more distillate streams of light distillate 24, medium distillate 26, first heavy distillate 26 or second heavy distillate 32 feeds as part of the feed 20 to said distillate hydrotreater 430 or combined with one or more heavy oil streams of light vacuum gas oil 36, heavy vacuum gas oil 38 and deasphalted oil 80, or both distillate streams and heavy oil streams, to form a portion of the feeds to either the distillate hydrotreater 430 or heavy oil hydrotreater 460, or both, as determined by sulfur content of the high sulfur fuel oil to optimize adjustment of hydrotreating conditions in zones 430 or 460, or adjusting both zone, to form a fuel having an actual sulfur content at or below a target sulfur content limit level.

In another embodiment of this invention, a clean fuel at or below sulfur content limit specifications can be formed by use of a heavy residual oil, including a high sulfur fuel oil which is typically atmospheric residue or heavier, which may have a density or a sulfur or metals content which is outside specifications or within typical standards for high sulfur fuel oil. Often, due to market considerations such heavy residual oil is available from a different source of supply than within battery limits of a fuels plant. The heavy residual having a sulfur content greater than the target sulfur content limit level of fuel 600 is fed to one or more of (a) vacuum distillation tower 200 separately or combined via line 30 with atmospheric residual feed to vacuum tower 200 to produce at least a portion of any or all of said a second heavy distillate 32, light vacuum gas oil 36, heavy vacuum gas oil or vacuum residual 50, or (b) to solvent separation 300 separately or combined via line 50 with vacuum residual feed to solvent separation 300 to produce at least a portion of deasphalted oil 80 or pitch 90 having metals rich heavy residual that is passed to gasification system 500 for gasification, sulfur recovery and other ancillary processing. Such heavy residual oil may also be combined with pitch via line 90 as feed to the utilities island 500. In variations, when untreated high sulfur fuel oil with relatively high sulfur (in excess of 0.5 wt. %) or high metals content is used without treatment for trim for adjustment of fuel 600 sulfur content of this invention, such use is in relatively minor adjustment amounts when used without treatment to ensure the combination 600 does not exceed target sulfur content limits.

The FIG. 2 flowsheet showing various intermediate individual products are for illustration and understanding of the main products and byproducts at effluents of each unit operation depicted. A selected variation of separation or treatment by each unit operation depends on crude and feeds selected and optimization of intermediates produced to produce fuel at or below target sulfur specification. For example, both effluents 60 and 70 from hydrotreaters 430 and 460 can be combined within hydrotreating zone 400 by use of a common gas-liquid separator (not shown) if ultralow diesel produced in zone 430 is not separated out and all hydrotreated materials are combined in line 70 as shown in FIG. 2, only gases are removed. Alternatively, if separation or removal of part of some wild naphtha or ultralow sulfur diesel for trim control of final combination zone 600 fuel sulfur content or for other reason is a process objective, effluents 60 and 70 from hydrotreaters 430 and 460 can be sent, either separately or combined to a stripper or fractionator to enable removal of a fraction of wild naphtha or ultralow sulfur diesel.

Although the various embodiments of the invention have been described, it is to be understood that they are meant to be illustrative only and not limiting. For illustration, when flashpoint of fuel is not a consideration, an untreated light tight oil or condensate, or a combination of untreated light tight oil or condensate, having low metals content and a sulfur content less than the target sulfur content is added as portion of the combination of said untreated fractions with said treated streams to form a fuel having an actual sulfur content at or below a target sulfur content. The term "light tight oil" or "LTO", as used herein means a well head condensate or shale gas condensate having (i) sulfur content in the ranges of 0.1 wt. % to 0.2 wt. % and a (ii) a density, API (Deg) in the range of 38 to 57 and (iii) wide variations of hydrocarbon ranges based sources. LTOs typically have prospective overlapping distillation cut fraction ranges, in weight percent of mass, of (a) 5 to 20 wt. % liquefied petroleum gas range, (b) 10 to 35 wt. % naphtha, (c) 15 to 30 wt. % kerosene, (d) 15 to 25% diesel, (e) vacuum gas oils and (f) no (0%) to 10% heavy residuals.

In one variation, this invention addresses co-processing of (i) a crude having the quality of untreated light tight oil or condensate, or a combination of light tight oil or condensate, for example, when available oil production basins from outside the battery limits of fuel production plant of this invention with (ii) with one or more other crude feeds to a process of this invention produce a low cost fuel having low metals content and a sulfur content less than a target sulfur content. Such light tight crude, with no (e.g. 0% or very low heavy residuals) likely do not contain sufficient heavier hydrocarbons within its bottoms fractions with residuals ranges to providing processing balance for desulfurization or other hydrotreating, nor corresponding residuals sufficient to support process hydrogen generation to enable cost effective processing such light crude to hydrogenate to lower sulfur and metals for decontamination or sufficient lubricity to support use in certain types of engines.

Embodiments of novel fuels of this invention are better appreciated with reference to ISO 8217 standard issued by International Organization for Standardization (ISO). ISO 8217 describes categories and detailed specifications for a range of marine residual fuels for consumption on board ships. The specifications acknowledge, as a basis for their development, variations in crude oil supplies, refining methods, and other conditions. Such specifications indicate they take into account various international requirements for such properties as sulfur content. The current strictest ISO 8217 is RMA 10, to which interpretation of specification and claims should be based. Based on simulated compositions of the novel fuels of this invention (being made by simulation model splitting crude into fractions, some of which are hydrotreated, and excluding residue which not solvent during solvent separation and then reconfiguring such untreated and treated segments), these novel meet and/or exceed all ISO RMA 10 specifications except flashpoint which, for cargo ships, falls within SOLAS exceptions for flash point requirements for cargo ships, which fuels have novel characteristics or improvements which we claim distinguish these novel fuels from such marine fuels from residuals.

In one variation, we provide an improved fuel meeting or exceeding all ISO RMA 10 (ISO 2817-10) specifications except flashpoint and having any or all of the following distinguishing characteristics: (a) sulfur at 0.50% m/m (wt. %) or below, preferably in the range of 0.05 to 0.20 m/m (wt. %), (b) metals at 5.0 mg/Kg (ppmwt) or below, preferably 1.0 mg/Kg (1.0 ppmwt) or below such as at 0.2 mg/Kg (0.2 ppmwt), and (c) flashpoint at not more than 60° C. and other improved features over ISO RMA 10 specifications. In variations, these novel fuels have having one or more of these additional distinguishing characteristics: (a) viscosity at not more than 10 cSt, (b) a pour point of 0 (zero) ° C. or less, (c) density in range of 820 to 880 Kg/M$^3$, (d) CCAI at not more than 800, (e) sodium at 20 mg/Kg or below, preferably 10 mg/Kg or below. All of the foregoing are determined by testing or computations methods specified by ISO 2817-10. Such fuels comprise a range of hydrocarbons having an initial boiling point of naphtha and highest boiling point being that of the highest boiling point of the component thereof which is soluble in a solvent suitable for solvent separation, such as heptane. Metals can be reduced to as low as 100 ppbwt, depending feed composition and adjustment of operating conditions.

We have discovered we can produce in a low cost manner such extremely low sulfur and metals fuels which fall within a SOLAS exception for flashpoint requirements for cargo ships. If flashpoint treatment is required for other uses, flashpoint treatment to have flashpoint at 60° C. or above, or such requirement, known in the art.

Using a low viscosity, low pour point fuel of this invention in marine engines to avoids or reduce energy consumption required in connection with heating conventional residual oils to enable their pumping and handling, either in port at fueling stations or at sea. Heavy residual oils are thick, need to be heated, and kept hot, because of their relatively high pour point and high viscosity, during all of storage, pumping, and feeding to marine engines, which heating consumes energy.

Table 1 below is shows two variations of fuels of this invention, being one with an extremely low sulfur content of 0.1 wt. % and the other at an even more reduced level of 0.05% wt. %, sulfur compared against ISO RMA 10 set forth in Table 1 below:

TABLE 1

| Simulated Characteristics For ISO 8217 | | Unit | Limit | ISO RMA 10 Spec | Example fuel of this Invention at target sulfur content limit of 0.05 wt. % | Example fuel of this Invention at target sulfur content limit of 0.1 wt. % | ISO Proposed Test Method for Reference as cited |
|---|---|---|---|---|---|---|---|
| Kinematic viscosity at 50° C.$^b$ | | mm$^2$/s where 1 mm$^2$/s = 1 cSt | max. min. | 10.00 | 10.00 | 10.00 | ISO 3104 |
| Density at 15° C. | | Kg/M$^3$ | max. min. | 920.0 | 880.0 820.0 | 880.0 820.0 | see 7.1 ISO 3675 or ISO 12185 |
| CCAI | | | max | 850 | 762 | 762 | See 6.3a) |
| Sulfur | | wt. % | Statute | Statute 0.10% in ECA 3.50% out ECA at 2016 | 0.05 | 0.10 | see 7.2 ISO 8754 ISO 14596 |
| Flashpoint | | ° C. | min | 60.0 | <60 | <60 | |
| Hydrogen sulfide | | mg/kg | max. | 2.00 | 2.00 | 2.00 | IP 570 |
| Acid number | | mg KOH/g | max. | 2.5 | 0.05 | 0.05 | ASTM D664 |
| Total sediment aged | | mass % | max. | 0.1 | 0.05 | 0.05 | see 7.5 ISO 10307-2 |
| Carbon residue: micro method | | mass % | max. | 2.50 | 1.5 | 1.5 | ISO 10370 |
| Pour point (upper)$^f$ | winter quality summer quality | C. C. | | 0 6 | 0 0 | 0 0 | ISO 3016 ISO 3016 |
| Water | | Volume % | max. | 0.30 | 0.30 | 0.30 | ISO 3733 |
| Ash | | mass % | max. | 0.040 | 0.03 | 0.03 | ISO 6245 |
| Vanadium | | mg/kg | max. | 50 | 0.2 | 0.2 | see 7.7 IP 501, IP 470 or ISO 14597 |
| Sodium | | mg/kg | max. | 50 | 10 | 10 | see 7.8 IP 501 IP 470 |
| Aluminum + Silicon | | max. | max | 25 | 0.2 | 0.2 | see 7.9 IP 501, IP 470 or ISO 10478 |

Such fuels of this invention having the properties shown in Table 1 are further distinguished in comprising the substantially the entire range of crude oil derived hydrocarbons from C3 or C5 to greater than C20, said hydrocarbons having an initial boiling point being the lowest boiling point of any fraction of said crude oil at atmospheric distillation conditions and highest boiling point being the final boiling point of the residual portion of said crude oil which is not soluble in a solvent suitable for solvent separation. Opposite thereto, residuals, whether vacuum distillation residual, solvent deasphalting residues, other cokers and the like do not contain such broad hydrocarbon range but are limited only very heavy materials.

From the disclosure in the specification and claims, this invention enables manufacture of ultraclean fuels that meet or exceeds standards for compatibility with current marine reciprocating engines but also are compatible with advanced combustion gas turbines that can be used in marine applications. Such advanced turbine engines are available today but are typically land based. These advanced turbine engines, once mobilized on board ships, can have a large efficiency advantage, with less corrosion or ash formation, by firing the fuels of this invention during voyage. Also, depending on available fuel economics at port, ships can gain efficiency advantage by filing these novel fuels at port to generate electrical power and transmit such power to local electric grid for revenue. Such revenue from in port power generation offsets at sea fuel costs and can drop the actual total at sea fuel cost to the ship to less than high sulfur fuel oil and thus offsets costs of use of low sulfur fuels of this invention if such are a more expensive voyage fuel. The ultimate gain is for the environment, when in certain base case comparisons, it is possibly to achieve more than a ninety five percent (95%) reduction in SOx and NOx emissions and potentially greater than 99% (almost 100%) reduction emissions of noxious metals emissions during voyage. In addition, the environment benefits from a CO2 reduction from two ways: (i) efficiency of advanced gas turbine engines on ships and (ii) efficiency of power generation at ports, where inefficient firing of coal, crude oil, residual oils or certain other fuels is replaced.

Thus, it is apparent that the present invention has broad application to production of fuels having reduced, low levels of sulfur and other contaminants and use of such fuels. Certain features may be changed without departing from the spirit or scope of the present invention. Accordingly, the invention is not to be construed as limited to the specific embodiments or examples discussed but only as defined in the appended claims or substantial equivalents of the claims.

The invention claimed is:

1. A method of combustion by firing a fuel meeting or exceeding all ISO RMA 10 (ISO 8217-10 of 2016) specifications except flashpoint, said fuel having:
   (a) sulfur at 0.50% m/m (wt. %) or below
   (b) flashpoint less than 60° C. and (c) said fuel composition characterized by reference to composition of hydrocarbon feed from which said fuel is formed and wherein said fuel comprises entire range of all C3 to greater than C20 hydrocarbons of said feed except
   (1) insoluble hydrocarbons which are not soluble in solvent suitable for solvent separation are removed, and
   (2) hydrocarbons with carbons below C5 are removed when butane and lighter are optionally removed.

2. A method of combustion by firing a fuel in accordance with claim 1 said fuel having density at 15° C. in range of 820 to 880 Kg/M3.

3. A method of combustion by firing a fuel in accordance with claim 1 said fuel composition is formed of hydrocarbon feed which comprises substantially the entire range of crude oil derived hydrocarbons from C3 or C5 to greater than C20, said fuel so formed having an initial boiling point being the lowest boiling point of any fraction of said crude oil at atmospheric distillation conditions which is combined in said fuel and highest boiling point being the highest boiling point of the highest boiling residual portion of said crude oil which is soluble in a solvent suitable for solvent separation and which is combined in said fuel.

4. A method of combustion by firing a fuel in accordance with claim 1 said fuel having sulfur at 0.50% m/m (wt. %) or below and insoluble hydrocarbons removed and further having both lower pour point and lower viscosity during all of storage, pumping, and feeding to marine engines relative to heavy residual oil having a sulfur content in excess of 0.50% m/m (0.5 wt. %).

* * * * *